United States Patent
Oosedo et al.

(10) Patent No.: US 6,515,081 B2
(45) Date of Patent: *Feb. 4, 2003

(54) COMPOSITION OF EPOXY RESIN, CURING AGENT AND REACTIVE COMPOUND

(75) Inventors: Hiroki Oosedo, Ehime (JP); Ryuji Sawaoka, Ehime (JP); Shunsaku Noda, Ehime (JP); Naomi Miyoshi, Ehime (JP)

(73) Assignee: Toray Industries, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,902

(22) PCT Filed: Oct. 14, 1998

(86) PCT No.: PCT/JP98/04650

§ 371 (c)(1),
(2), (4) Date: Jun. 14, 1999

(87) PCT Pub. No.: WO99/19407

PCT Pub. Date: Apr. 22, 1999

(65) Prior Publication Data

US 2002/0007022 A1 Jan. 17, 2002

(30) Foreign Application Priority Data

Oct. 14, 1997 (JP) .............................. 9-280351
Dec. 10, 1997 (JP) .............................. 9-339731

(51) Int. Cl.$^7$ .................. B32B 27/04; B32B 27/38; C08L 63/02; C08L 63/10; C08L 67/06

(52) U.S. Cl. ................. 525/531; 428/297.4; 428/301.4; 525/109; 525/113; 525/328.8; 525/330.3; 525/423; 525/425; 525/502; 525/524; 525/529; 525/530

(58) Field of Search ................. 525/531, 529, 525/58, 59, 61, 109, 113, 328.8, 330.3, 423, 425, 502, 524, 530; 428/297.4, 301.4

(56) References Cited

U.S. PATENT DOCUMENTS

| | | | | |
|---|---|---|---|---|
| 4,309,512 A | * | 1/1982 | Mikogami et al. ............. 525/58 |
| 4,487,863 A | | 12/1984 | Goan ........................ 523/512 |
| 4,859,533 A | * | 8/1989 | Seiya et al. ................. 428/366 |
| 4,873,309 A | * | 10/1989 | Corley ........................ 528/102 |
| 4,874,833 A | * | 10/1989 | Kershaw ...................... 528/90 |
| 4,956,411 A | | 9/1990 | Tada et al. .................... 528/93 |
| 5,128,425 A | | 7/1992 | Shiraishi et al. ............. 525/484 |
| 6,017,588 A | * | 1/2000 | Watanabe et al. ............. 156/94 |

FOREIGN PATENT DOCUMENTS

| | | | |
|---|---|---|---|
| JP | 47-39233 | * | 10/1972 |
| JP | 48-19866 | * | 6/1973 |
| JP | 5-320480 A | * | 12/1993 |
| JP | 07041650 | | 2/1995 |

OTHER PUBLICATIONS

In re Luvisi et al., 144 USPQ 646, pp. 646 and 647–651.*

* cited by examiner

*Primary Examiner*—Robert E.L. Sellers
(74) *Attorney, Agent, or Firm*—Morrison & Foerster LLP

(57) ABSTRACT

A thermosetting resin composition for carbon fiber reinforced composite materials of the present invention chiefly comprises (A)2 thermosetting resin such as epoxy resin and a curing agent, and (B)2 compound containing one functional group which can react with thermosetting resin (A) or its curing agent, and a moiety selected from the following formulae (1) to (4)

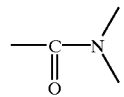

(1)

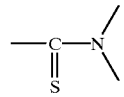

(2)

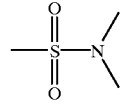

(3)

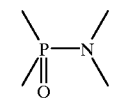

(4)

Furthermore, the present invention also relates to a prepreg formed by impregnating reinforcing fiber with the aforesaid resin composition and to carbon fiber reinforced composite materials comprising reinforcing fiber and a cured aforesaid thermosetting resin composition.

7 Claims, 2 Drawing Sheets

COMPOSITION OF EPOXY RESIN, CURING AGENT AND REACTIVE COMPOUND

TECHNICAL FIELD

The present invention relates to fiber reinforced composite materials suitable for sports applications, aerospace applications and general industrial applications, and to a thermosetting resin composition and a prepreg for obtaining these composite materials.

TECHNICAL BACKGROUND

On account, in particular, of their outstanding mechanical properties, fiber reinforced composite materials comprising reinforcing fiber and a matrix resin are widely employed in sports applications, aerospace applications and general industrial applications.

In these applications, carbon fiber, aramid fiber and glass fiber are chiefly employed as the reinforcing fiber. Of these, carbon fiber is outstanding in its specific strength and specific modulus and it is particularly important in that high performance composite materials can be obtained.

Both thermoplastic resins and thermosetting resins are used as the matrix resin, but thermosetting resins are most often employed because of their excellent impregnation of the reinforcing fiber.

As thermosetting resins, epoxy resins, resins with a plurality of polymerizable unsaturated bonds in the molecule (vinyl ester resins, unsaturated polyester resins and the like), phenolic resins and cyanate resins are chiefly used.

Fiber reinforced composite materials are heterogeneous materials comprising the aforesaid reinforcing fiber and matrix resin, and the adhesion between them has a considerable influence on the properties, as described below.

In general, with a fiber reinforced composite material, the strength in the direction of the fiber orientation is high, reflecting the properties of the reinforcing fiber, but the strength in directions in which there is no fiber orientation and the shear strength are not necessarily excellent, and indeed not uncommonly they are the weak points in terms of the performance of a fiber reinforced composite material.

Improving the adhesion between the reinforcing fiber and the matrix resin is effective in raising the strength in directions in which there is no fiber orientation and the shear strength. A known means for improving the adhesion between the reinforcing fiber and the matrix resin is surface treatment of the reinforcing fiber, for example the silane coupling agent treatment of glass fiber and the electrolytic oxidation of carbon fiber, but hardly any effective methods are known for improving the adhesion based on resin technology. In particular, in the case of carbon fiber, when adhesion is improved by electrolytic oxidation, this is at the expense of the fiber strength so that there are limits thereto, and while there has been a strong demand for alternative means for improving the adhesion, no effective means has hitherto be found.

In U.S. Pat. No. 4,873,309, there is disclosed a resin composition comprising (a) an epoxy resin containing bromine, (b) its curing agent, and (c) monomer having at least one vinyl unsaturated bond. Specific examples here of (c), along with styrene, methyl methacrylate, acrylonitrile, vinyl acetate and many other general monomers, include acrylamide and its derivatives, and there is also mention of carbon fiber but unrelated to these. The function of (c) in that invention is as a diluent for achieving a lower viscosity, and there is no suggestion at all of combining a specific amount of acrylamide or derivative thereof and carbon fiber, nor that the combination thereof differs from combinations of carbon fiber and other general monomers in that a dramatic effect is shown in terms of improving adhesion and enhancing the elastic modulus, and so the invention in no way relates to the concept of the present invention. Again, the fact that a comparatively large amount of (c) is added in that invention differs from the incorporation of a relatively small amount of component (B) in the present invention.

On the other hand, in U.S. Pat. No. 4,230,766, there is described an example in which a composition comprising thermosetting resin and vinyl pyrrolidone is used to impregnate carbon fiber, then the composition partially cured by light irradiation, after which hot curing is performed and a fiber reinforced composite material obtained. However, in that example, the amount of vinyl pyrrolidone added is excessive, and there is absolutely no suggestion that by adding a specific amount there is a dramatic effect in terms of improving the adhesion and enhancing the elastic modulus without impairing other physical properties.

The objective of the present invention is to offer a thermosetting resin composition for fiber reinforced composite materials where the cured product thereof shows outstanding adhesion to the reinforcing fiber, in particular carbon fiber, together with a prepreg employing said resin composition and carbon fiber reinforced composite materials of outstanding properties obtained using same.

DISCLOSURE OF THE INVENTION

In order to realise these objectives, the thermosetting resin composition for carbon fiber reinforced composite materials of the present invention comprises the following components.

(A) Thermosetting resin
(B) Compound having one functional group which can react with thermosetting resin (A), or its curing agent, and which contains a moiety selected from the following formulae (1) to (4)

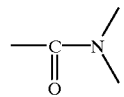

(1)

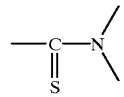

(2)

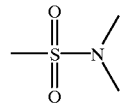

(3)

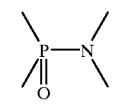

(4)

Furthermore, the prepreg of the present invention is a prepreg formed by the impregnation of reinforcing fiber with the aforesaid resin composition, and the carbon fiber reinforced composite materials of the present invention are carbon fiber reinforced composite materials comprising cured aforesaid thermosetting resin composition and reinforcing fiber.

Explanation of the Numerical Codes

Figure 1:
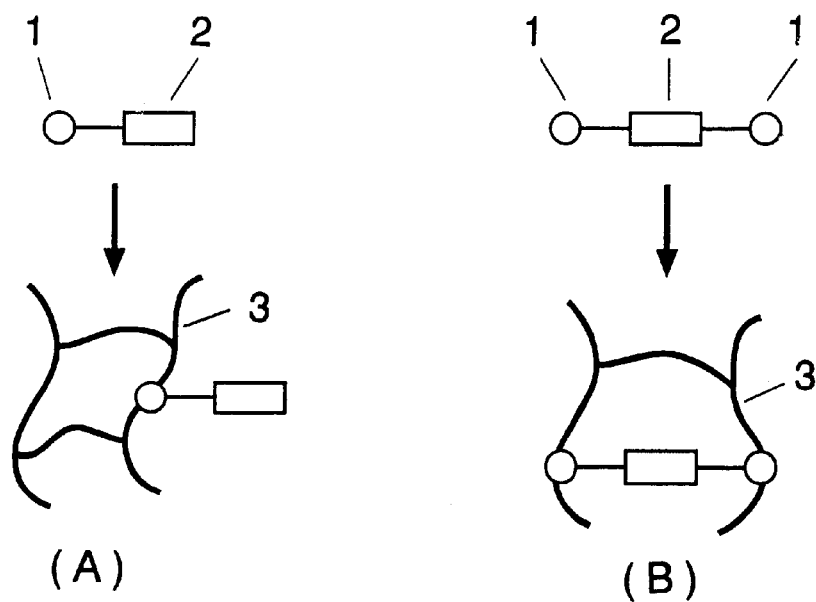
FIG. 1 is a schematic diagram of a polymer network.

| | |
|---|---|
| 1: a functional group which reacts with the thermosetting resin or its curing agent | |
| 2: a moiety represented by any of formulae (1) to (4) | |
| 3: polymer network | 4: drum |
| 5: release paper | 6: carbon fibre strands |
| 7: adhesive agent | 8: cut line |
| 9: carbon fibre sheet material | 10: fixed chuck |
| 11: moveable chuck | 12: screw |
| 13: knob | 14: lower mould |
| 15: spacer | 16: upper mould |

Optimum Mode for Practising the Invention

Reference to the thermosetting resin, which is component (A) in the epoxy resin composition used for fiber reinforced composite materials of the present invention, means a precursor which is thermally cured, that is to say which reacts thermally to produce a polymer with a network structure. Specific examples of thermosetting resins are epoxy resins, resins with a plurality of polymerizable unsaturated bonds in the molecule (vinyl ester resins, unsaturated polyester resins, diallyl phthalate resins, maleimide resins), phenolic resins, cyanate resins, melamine resins, urea resins, polyurethane resins, benzoxazine resins, oxazoline resins and the like.

Of these, the epoxy resins, vinyl ester resins and unsaturated polyester resins are suitable for general applications. Phenolic resins are suitable for applications where flame retardancy is demanded, for example as building materials and aircraft interior trim materials. Cyanate resins and maleimide resins are suitable for applications where heat resistance is demanded, for example structural materials for artificial satellites.

Component (B) is a compound which contains one functional group which can react with thermosetting resin (A) or with its curing agent, and a moiety selected from the following formulae (1) to (4).

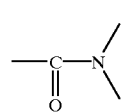
(1)

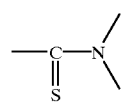
(2)

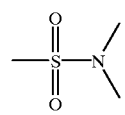
(3)

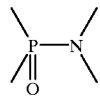
(4)

The structures represented by formulae (1) to (4) may also be one part of a still more complex structure. For example, typical compounds with the amide linkage represented by general formula (1) are carboxamides but, besides these, the compound may also have the amide linkage as part of a ring or more complex structure, for example it may be an imide, urethane, urea, biuret, hydantoin, carboxylic acid hydrazide, hydroxamic acid, semicarbazide, semicarbazone or the like.

Component (B) is a compound incorporated in order to raise the adhesion to the reinforcing fiber. This component (B) reacts with the thermosetting resin or with its curing agent, so that the cured matrix resin has structures selected from general formulae (1) to (4).

The structures selected from general formulae (1) to (4) strongly interact with the reinforcing fiber, and improve the adhesion. Effective interactions comprise the following two types.

The first is hydrogen bonding. This is effective in cases where there are functional groups with, for example, OH or NH structures present at the reinforcing fiber surface.

The second is electrical attraction between dipoles. The structures selected from general formulae (1) to (4) are strong permanent dipoles. Induced dipoles are produced by permanent dipoles and then electrical attraction occurs between the two. The electrical attraction between dipoles is particularly important in terms of reinforcing fibers such as carbon fiber where there are few surface functional groups and where there has been no effective means hitherto for improving adhesion.

In order that the structures selected from general formulae (1) to (4) interact effectively with the reinforcing fiber, it is necessary to bring them into contact with the reinforcing fiber surface. Hence, component (B) has one functional group which can react with the thermosetting resin or with its curing agent. Where it has a plurality of functional groups which can react with the thermosetting resin or with its curing agent, the structures selected from general formulae (1) to (4) are readily incorporated into the interior of the network structure so that they do not readily contact the reinforcing fiber surface (FIG. 1B). Where there is one reactable functional group, the structures selected from general formulae (1) to (4) are not bound within the network and so readily contact the reinforcing fiber surface (FIG. 1B).

The functional group in component (B) which can react with the thermosetting resin or with its curing agent is selected according to the particular thermosetting resin employed, but it is preferred that it has relatively slow reactivity compared to the reaction of the thermosetting resin, which is the chief reaction, or compared to the reaction between the thermosetting resin and its curing agent. This is because, in such circumstances, the rate of consumption of component (B) in the initial period of the reaction is low, so that it mainly reacts in the latter period of the curing reaction, with the result that the structures selected from general formulae (1) to (4) are mostly present at the terminal regions of the network polymer, and so a considerable effect is readily obtained with just a low level of addition.

Moreover, the incorporation of component (B) does not merely improve the adhesion, but also has the effect of raising the elastic modulus of the cured thermosetting resin composition. This is thought to be because the structures selected from general formulae (1) to (4) produce powerful hydrogen bonding with structures such as OH and NH present in the cured material and so restrict molecular motion.

Epoxy resins are preferably used as the thermosetting resin employed in the thermosetting resin composition for fiber reinforced composite materials of the present invention. Epoxy resin means a compound having two or more epoxy groups in the molecule.

Specifically, there may be used a glycidyl ether obtained from a polyol, a glycidyl amine obtained from an amine with a plurality of active hydrogens, a glycidyl ester obtained from a polycarboxylic acid, a polyepoxide obtained by the oxidation of a compound with a plurality of double bonds in the molecule, or the like.

As specific examples of glycidyl ethers, there are the following.

Firstly, there are bisphenol type epoxy resins such as the bisphenol A type epoxy resins obtained from bisphenol A, the bisphenol F type epoxy resins obtained from bisphenol F, the bisphenol S type epoxy resins obtained from bisphenol S and the tetrabromobisphenol A type epoxy resins obtained from tetrabromobisphenol A. Examples of bisphenol A type epoxy resin commercial products are "Epikote" 825 (epoxy equivalent 172–178), "Epikote" 828 (epoxy equivalent 184–194), "Epikote" 834 (epoxy equivalent 230–270), "Epikote" 1001 (epoxy equivalent 450–500), "Epikote" 1002 (epoxy equivalent 600–700), "Epikote" 1003 (epoxy equivalent 670–770), "Epikote" 1004 (epoxy equivalent 875–975), "Epikote" 1007 (epoxy equivalent 1750–2200), "Epikote" 1009 (epoxy equivalent 2400–3300), "Epikote" 1010 (epoxy equivalent 3000–5000) (the above are made by Yuka Shell Epoxy K.K.), "Epotohto" YD-128 (epoxy equivalent 184–194), "Epotohto" YD-011 (epoxy equivalent 450–500), "Epotohto" YD-014 (epoxy equivalent 900–1000), "Epotohto" YD-017 (epoxy equivalent 1750–2100), "Epotohto" YD-019 (epoxy equivalent 2400–3000), "Epotohto" YD-022 (epoxy equivalent 4000–6000) (the above are made by the Tohto Kasei Co.), "Epiclon" 840 (epoxy equivalent 180–190), "Epiclon" 850 (epoxy equivalent 184–194), "Epiclon" 830 (epoxy equivalent 165–185), "Epiclon" 1050 (epoxy equivalent 450–500), "Epiclon" 3050 (epoxy equivalent 740–860), "Epiclon" HM-101 (epoxy equivalent 3200–3900) (the above are made by Dainippon Ink & Chemicals Inc.), "Sumi-epoxy" ELA-128 (epoxy equivalent 184–194, made by the Sumitomo Chemical Co.) and DER331 (epoxy equivalent 182–192, made by the Dow Chemical Co.). Examples of bisphenol F type epoxy resin commercial products are "Epikote" 806 (average epoxy equivalent 160–170), "Epikote" 807 (epoxy equivalent 160–175), "Epikote" E4002P (epoxy equivalent 610), "Epikote" E4003P (epoxy equivalent 800), "Epikote" E4004P (epoxy equivalent 930), "Epikote" E4007P (epoxy equivalent 2060), "Epikote" E4009P (epoxy equivalent 3030), "Epikote" E4010P (epoxy equivalent 4400) (the above are made by Shell Yuka Epoxy K.K.), "Epiclon" 830 (epoxy equivalent 165–180, made by Dainippon Ink and Chemicals Inc.), "Epotohto" YDF-2001 (epoxy equivalent 450–500) and "Epotohto" YDF-2004 (epoxy equivalent 900–1000) (the above are made by the Tohto Kasei Co.). An example of a bisphenol S type epoxy resin commercial product is "Denacol" EX-251 (made by Nagase Chemicals Ltd., epoxy equivalent 189). Examples of tetrabromobisphenol A type epoxy resin commercial products are "Epikote" 5050 (made by Yuka Shell Epoxy K.K., epoxy equivalent 380–410), "Epiclon" 152 (made by Dainippon Ink & Chemicals Inc., epoxy equivalent 340–380), "Sumi-epoxy" ESB-400T (made by the Sumitomo Chemical Co., epoxy equivalent 380–420) and "Epotohto" YBD-360 (made by Tohto Kasei Co., epoxy equivalent 350–370).

Again, there are the novolak type epoxy resins which are the glycidyl ethers of novolaks obtained from phenol or phenol derivatives such as alkylphenols, halophenols and the like. As examples of novolak type epoxy resin commercial products, there are "Epikote" 152 (epoxy equivalent 172–179), "Epikote" 154 (epoxy equivalent 176–181) (these are made by Yuka Shell Epoxy K.K.), DER438 (epoxy equivalent 176–181, made by the Dow Chemical Co.), "Araldite" EPN1138 (epoxy equivalent 176–181, made by Ciba), "Araldite" EPN1139 (epoxy equivalent 172–179, made by Ciba), "Epotohto" YCPN-702 (epoxy equivalent 200–230, made by the Tohto Kasei Co.) and Bren-105 (epoxy equivalent 262–278, made by the Nippon Kayaku Co.).

Additionally, there are the resorcinol diglycidyl ether "Denacol" EX-201 (made by Nagase Chemicals Ltd., epoxy equivalent 118), the hydroquinone diglycidyl ether "Denacol" EX-203 (made by Nagase Chemicals Ltd., epoxy equivalent 112), the 4,4'-dihydroxy-3,3',5,5'-tetramethylbiphenyldiglycidyl ether "Epikote" YX4000 (made by Yuka Shell Epoxy, epoxy equivalent 180–192), the 1,6-dihydroxynaphthalene diglycidyl ether "Epiclon" HP-4032H (made by Dainippon Ink & Chemicals Inc., epoxy equivalent 250), the 9,9-bis(4-hydroxyphenylfluorene diglycidyl ether "Epon" HPT Resin 1079 (made by Shell, epoxy equivalent 250–260), the tris(p-hydroxyphenyl) methane triglycidyl ether TACTIX 74 (made by the Dow Chemical Co., epoxy equivalent 150–157), the tetrakis(p-hydroxyphenyl)ethane tetraglycidyl ether "Epikote" 1031S (made by Yuka Shell Epoxy K.K., epoxy equivalent 196), the glycerol triglycidyl ether "Denacol" EX-314 (made by Nagase Chemicals Ltd., epoxy equivalent 145), the pentaerythritol tetraglycidyl ether "Denacol" EX-411 (made by Nagase Chemicals Ltd., epoxy equivalent 231), and the oxazolidone type epoxy resins XAC4151 (made by Asahi-CIBA Ltd., epoxy equivalent 412) and XAC4152 (made by Asahi-CIBA Ltd., epoxy equivalent 338) which are obtained by the reaction between a bisphenol A type epoxy resin and a bifunctional isocyanate.

Specific examples of the glycidyl amines are diglycidylaniline, the tetraglycidyldiaminodiphenylmethane "Sumi-epoxy" ELM434 (made by the Sumitomo Chemical Co., epoxy equivalent 110–130), and the tetraglycidyl m-xylylenediamine TETRAD-X (made by Mitsubishi Gas Chemical Co., epoxy equivalent 90–105).

Furthermore, as examples of epoxy resins which combine both glycidyl ether and glycidyl amine structures, there are the triglycidyl-m-aminophenol "Sumi-epoxy" ELM120 (epoxy equivalent 118, made by the Sumitomo Chemical Co.) and the triglycidyl-p-aminophenol "Araldite" MY0510 (made by Ciba-Geigy, epoxy equivalent 94–107).

Specific examples of glycidyl esters are diglycidyl phthalate, diglycidyl terephthalate and the diglycidyl ester of dimer acid.

Moreover, as an example of an epoxy resin with glycidyl groups other than these, there is triglycidylisocyanurate.

As examples of polyepoxides obtained by the oxidation of compounds with a plurality of double bonds in the molecule, there are epoxy resins with an epoxycyclohexane ring, specific example of which are Union Carbide's ERL-4206 (epoxy equivalent 70–74), ERL-4221 (epoxy equivalent 131–143) and ERL-4234 (epoxy equivalent 133–154). Another example is epoxidized soybean oil.

The epoxy resin is used in combination with a curing agent. As examples of the curing agent, there are aromatic amines with active hydrogen such as 4,4'-diaminodiphenylmethane, 4,4'-diaminodiphenylsulphone, 3,3'-diaminodiphenylsulphone, m-phenylenediamine, m-xylylenediamine and the like, aliphatic amines with active hydrogen such as diethylenetriamine, triethylenetetramine, isophoronediamine, bis(aminomethyl) norbomane, bis(4-aminocyclohexyl)methane, polyethyleneimine dimer acid ester and the like, modified amines obtained by the reaction of these active hydrogen-containing amines with an epoxy compound, acrylonitrile, phenol and formaldehyde, thiourea and the like, tertiary amines without active hydrogen such as dimethylaniline, dimethylbenzylamine, 2,4,6-tris(dimethylaminomethyl) phenol and 1-substituted imidazole, dicyandiamide, tetramethylguanidine, carboxylic acid anhydrides such as hexahydrophthalic anhydride, tetrahydrophthalic anhydride, methylhexahydrophthalic anhydride, methylnadic anhydride and the like, polycarboxylic acid hydrazides such as adipic acid hydrazide and naphthalenedicarboxylic acid hydrazide, polyphenol compounds such as novolak resins, polymercaptans such as the esters of thioglycolic acids and polyols, Lewis acid complexes such as boron trifluoride ethylamine complex, and aromatic sulphonium salts.

These curing agents can be combined with suitable curing auxiliaries to increase the curing activity. Preferred examples thereof are the combination of a urea derivative such as 3-phenyl-1,1-dimethylurea, 3-(3,4-dichlorophenyl)-1,1-dimethylurea (DCMU), 3-(3-chloro-4-methylphenyl)-1,1-dimethylurea or 2,4-bis(3,3-dimethylureido)toluene as a curing auxiliary with dicyandiamide, and the combination of a tertiary amine as a curing auxiliary with a carboxylic acid anhydride or novolak resin. The compounds used as curing auxiliaries often have the capacity to cure epoxy resins by themselves.

Where component (A) is an epoxy resin, the following are preferred examples of the functional group in component (B) which can react with (A) or with its curing agent. They include functional groups which can react with the epoxy resin such as the carboxyl group, phenolic hydroxyl group, amino group, secondary amine structure, mercapto group and epoxy group.

As compounds with one group selected from the carboxyl group, phenolic hydroxyl group, amino group, secondary amine structure, mercapto group and epoxy group, there can be used those represented by general formula (6) or (7) below.

(6)

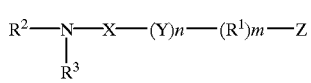

(Here, X represents one of the following,

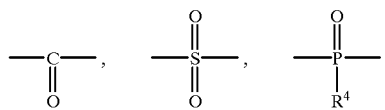

where $R^4$ represents an alkyl group or aryl group.

Y represents —O— or —$NR^5$—, where $R^5$ represents an alkyl group or aryl group, and n represents 0 or 1.

$R^1$ represents a divalent group derived from a hydrocarbon, and m represents 0 or 1.

Z represents a carboxyl group, phenolic hydroxyl group, amino group, mercapto group, —$NHR^6$ or

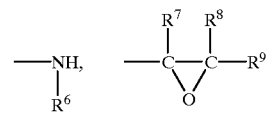

where $R^6$, $R^7$, $R^8$ and $R^9$ each represent hydrogen, an alkyl group or an aryl group.

$R^2$ represents hydrogen, an alkyl group or an aryl group, $R_3$ represents hydrogen, an alkyl group, aryl group, —$WR^{10}$, —W—$OR^{11}$ or —W—$NR^{12}R^{13}$, where $R^{10}$ and $R^{11}$ each represent an alkyl group or an aryl group, $R^{12}$ and $R^{13}$ each represent hydrogen, an alkyl group or an aryl group, and W represents —CO— or —$SO_2$—.

The aforesaid alkyl groups, aryl groups and $R^1$ may also have substituent groups selected from alkyl groups, aryl groups, halogens and alkoxy groups. In addition, any two of $R^1$, $R^2$, $R^3$, $R^5$ and $R^6$ may form a ring.)

(7)

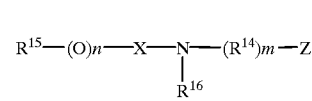

(Here, X represents one of the following,

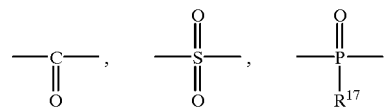

where $R^{17}$ represents an alkyl group or aryl group, and n represents 0 or 1.

$R^{14}$ represents a divalent group derived from a hydrocarbon, and m represents 0 or 1.

Z represents a carboxyl group, phenolic hydroxyl group, amino group, mercapto group, —$NHR^{18}$ or

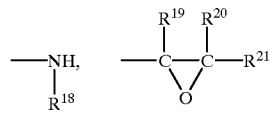

where $R^{18}$, $R^{19}$, $R^{20}$ and $R^{21}$ each represent hydrogen, an alkyl group or an aryl group. $R^{15}$ represents an alkyl group or an aryl group, and $R_{16}$ represents hydrogen, an alkyl group, aryl group or acyl group.

The aforesaid alkyl groups, aryl groups and $R^{14}$ may also have substituent groups selected from alkyl groups, aryl groups, halogens and alkoxy groups. In addition, any two of $R^{14}$, $R^{15}$, $R^{16}$ and $R^{18}$ may form a ring.)

As specific examples of the compounds represented by general formula (6) having one carboxyl group, there are oxamic acid, succinamidic acid, 2-(phenylcarbamoyloxy) propionic acid and 5-hydantoinacetic acid.

As specific examples of the compounds represented by general formula (7) having one carboxyl group, there are N-acetylglycine, N-acetylalanine, 4-acetamidobenzoic acid, N-acetylanthranilic acid, 4-acetamidobutyric acid, 6-acetamidohexanoic acid, hippuric acid, pyroglutamic acid, N-tosylglycine and N-dimethylphosphinoylglycine.

As specific examples of the compounds represented by general formula (6) having one phenolic hydroxyl group, there are salicylamide, 4-hydroxybenzamide and 4-hydroxyphenylacetamide.

As specific examples of the compounds represented by general formula (7) having one phenolic hydroxyl group, there are 4-hydroxyacetanilide, 3-hydroxyacetanilide and N-acetyltyramine.

As specific examples of the compounds represented by general formula (6) having one amino group, there are 4-aminobenzamide, 3-aminobenzamide, 4-aminobutyramide, 6-aminohexanoamide, 3-aminophthalimide, 4-aminophthalimide, sulphanilamide, 1-butyl-3-sulphanilylurea, asulam, Fast Red ITR base, FGL base and 2-amino-N-ethyl-N-phenylbenzenesulphonamide.

As specific examples of the compounds represented by general formula (7) having one amino group, there are 4'-aminoacetanilide, 4'-amino-N-methylacetanilide and 3'-aminopropionanilide.

As specific examples of the compounds represented by general formula (6) having one secondary amine structure, there are nipecotamide, N,N-diethylnipecotamide and isonipecotamide.

As specific examples of the compounds represented by general formula (7) having one secondary amine structure, there are 1-acetylpiperazine and 1-tosylpiperazine.

As specific examples of the compounds represented by general formula (7) having one mercapto group, there are 4-acetamidothiophenol and N-(2-mercaptoethyl)acetamide.

As specific examples of the compounds represented by general formula (6) having one epoxy group, there are glycidamide, N-phenylglycidamide, N,N-diethylglycidamide, N-methoxymethylglycidamide, N-hydroxymethylglycidamide, 2,3-epoxy-3-methylbutyramide, 2,3-epoxy-2-methylpropionamide and 9,10-epoxystearamide.

As a specific example of the compounds represented by general formula (7) having one epoxy group, there is N-glycidylphthalimide.

As well as the compounds represented by general formulae (6) and (7) above, as compounds with one amino group there are hydrazides, specific examples of which are acetohydrazide, benzohydrazide, 3-aminorhodanine and benzenesulphohydrazide.

A double bond conjugated with a carbonyl group is an example of a functional group which can react with the curing agent. The carbonyl group and conjugated double bond undergo a Michael type addition reaction with amino or mercapto groups in the curing agent.

As compounds with one double bond conjugated with a carbonyl group, there are the compounds represented by general formulae (8) or (9).

$$R^{26}-N-X-(Y)n-R^{22}-O-C-C=C-R^{25} \quad (8)$$
$$\phantom{R^{26}-N}|\phantom{X-(Y)n-R^{22}-O-}\|\phantom{C}|\phantom{C}|$$
$$\phantom{R^{26}-N}R^{27}\phantom{X-(Y)n-R^{22}-O-}O\phantom{C}R^{23}\phantom{C}R^{24}$$

(Here, X represents one of the following $$-\underset{\overset{\|}{O}}{\overset{\overset{\|}{O}}{C}}-, \quad -\underset{\overset{\|}{O}}{\overset{\overset{\|}{O}}{S}}-, \quad -\underset{R^{28}}{\overset{\overset{\|}{O}}{P}}-$$

where $R^{28}$ represents an alkyl group or aryl group.

Y represents —O— or —NR$^{29}$—, where R$^{29}$ represents an alkyl group or aryl group, and n is 0 or 1.

R$_{22}$ represents a divalent group derived from a hydrocarbon,

R$^{23}$, R$^{24}$ and R$^{25}$ each represent hydrogen, an alkyl group or an aryl group, R$_{26}$ represents hydrogen, an alkyl group or an aryl group, R$^{27}$ represents hydrogen, an alkyl group, an aryl group, —WR$^{30}$, —W—OR$_{31}$ or —W—NR$^{32}$R$^{33}$, where R$^{30}$ and R$^{31}$ represent an alkyl group or aryl group, R$^{32}$ and R$^{33}$ represent hydrogen, an alkyl group or aryl group, and W represents —CO— or —SO$_2$—.

The aforesaid alkyl groups, aryl groups and R$^{22}$ may also have substituent groups selected from alkyl groups, aryl groups, halogens and alkoxy groups. In addition, any two of R$^{22}$, R$^{23}$, R$^{24}$, R$^{25}$, R$^{26}$, R$^{27}$, and R$_{29}$ may form a ring.)

$$R^{38}-(O)n-X-N-R^{34}-O-C-C=C-R^{37} \quad (9)$$
$$\phantom{R^{38}-(O)n-X-}|\phantom{R^{34}-O-}\|\phantom{C}|\phantom{C}|$$
$$\phantom{R^{38}-(O)n-X-}R^{39}\phantom{R^{34}-O-}O\phantom{C}R^{35}\phantom{C}R^{36}$$

(Here, X represents any of the following, $$-\underset{\overset{\|}{O}}{\overset{\overset{\|}{O}}{C}}-, \quad -\underset{\overset{\|}{O}}{\overset{\overset{\|}{O}}{S}}-, \quad -\underset{R^{40}}{\overset{\overset{\|}{O}}{P}}-$$

where $R^{40}$ represents an alkyl group or aryl group, and n represents 0 or 1.

$R^{34}$ represents a divalent group derived from a hydrocarbon.

$R^{35}$, $R^{36}$ and $R^{37}$ each represent hydrogen, an alkyl group or an aryl group.

$R^{38}$ represents an alkyl group or aryl group, and $R^{39}$ represents hydrogen, an alkyl group, an aryl group or an acyl group.

The aforesaid alkyl groups, aryl groups and $R^{34}$ may also have substituent groups selected from alkyl groups, aryl groups, halogens and alkoxy groups. In addition, any two of $R^{34}$, $R^{35}$, $R^{36}$, $R^{37}$, $R^{38}$ and $R^{39}$ may form a ring.)

Furthermore, in the compound with one double bond conjugated with a carbonyl group, the carbonyl group conjugated with the double bond may also be the same as the carbonyl group of the structure represented by general formula (1). That is to say, the compound may also have a moiety represented by formula (5).

$$\underset{/}{\overset{\backslash}{N}}-\underset{\overset{\|}{O}}{C}-C=C- \quad (5)$$

As a compound with a moiety represented by formula (5), there can be used a compound represented by general formula (10).

$$R^{44}-N-C-C=C-R^{43} \quad (10)$$
$$\phantom{R^{44}-}|\phantom{-}\|\phantom{-}|\phantom{-}|$$
$$\phantom{R^{44}-}R^{45}\phantom{-}O\phantom{-}R^{41}\phantom{-}R^{42}$$

(Here, R$^{41}$, R$^{42}$ and R$^{43}$ each represent hydrogen, an alkyl group or an aryl group.

R$_{44}$ represents hydrogen, an alkyl group or an aryl group, and R$^{45}$ represents hydrogen, an alkyl group, an aryl group, —$WR^{46}$, —W—$OR^{47}$ or —W—$NR^{48}R^{49}$, where $R^{46}$ and $R^{47}$ each represent an alkyl group or aryl group, $R^{48}$ and $R^{49}$ each represent hydrogen, an alkyl group or an aryl group, and W represents —CO— or —SO2—.

The aforesaid alkyl groups and aryl groups may also have substituent groups selected from alkyl groups, aryl groups, halogens and alkoxy groups. In addition, any two of $R^{41}$, $R^{42}$, $R^{43}$, $R_{44}$ and $R^{45}$ may form a ring.)

As the compound with a moiety represented by formula (5), it is also possible to use maleimide or a maleimide derivative having an alkyl group or aryl group as a substituent.

Specific examples of the compounds represented by general formula (8) are 2-(phenylcarbamoyloxy)ethyl methacrylate, 2-(methacryloyloxy)propionamide, 2-(phenylureido)ethyl methacrylate, lactamide acrylate, lactamide methacrylate, 2-(dimethylthiocarbamoyloxy)ethyl methacrylate and 2-(tosylcarbamoyloxy)ethyl methacrylate.

Specific examples of the compounds represented by general formula (9) are 2-(methoxycarbonylamino)ethyl methacrylate and 2-(phenoxycarbonylamino)ethyl methacrylate.

Specific examples of the compounds represented by general formula (10) are acrylamide, methacrylamide, crotonamide, cinnamamide, N,N-dimethylacrylamide, N,N-diethylacrylamide, N-tert-butylacrylamide, N-isopropylacrylamide, N-butylacrylamide, N-hydroxymethylacrylamide, N-methoxymethylacrylamide, diacetone acrylamide, 1-acryloylmorpholine, 1,2,3,6-tetrahydrophthalimide and nadimide.

As maleimide derivatives with an alkyl or aryl substituent group, there are N-ethylmaleimide, N-isopropylmaleimide and N-phenylmaleimide.

Where there is a low blended amount of component (B) in the case where component (A) is an epoxy resin, there is little adhesion improvement effect, while if the amount is high then the heat resistance of the cured material is reduced. Thus, the blended proportion of component (B), per 100 parts by weight of the epoxy resin which constitutes component (A), needs to be from 0.5 to 20 parts by weight, with the range 0.5 to 15 parts by weight being preferred and 0.5 to 5 parts by weight being further preferred.

A compound with a plurality of polymerizable unsaturated bonds is also favourably employed as the thermosetting resin used in the thermosetting resin composition for fiber reinforced composite materials of the present invention. A compound with ester linkages is preferably used as this compound with a plurality of polymerizable unsaturated bonds in the molecule.

A first specific example of such a component (A) having ester linkages is an unsaturated polyester resin. Unsaturated polyester resins are polyesters based on a polycarboxylic acid with a polymerizable unsaturated bond or derivative thereof (an ester or anhydride) as the raw material. They are obtained, for example, by the polymerization of the polycarboxylic acid with a polymerizable unsaturated bond, or derivative thereof, and a polyol, in certain cases with the addition of a polycarboxylic acid which does not have a polymerizable unsaturated bond or derivative thereof.

As the polycarboxylic acid with a polymerizable unsaturated bond referred to here, there can be used one or more of maleic acid, fumaric acid, itaconic acid, tetrahydrophthalic acid, methyltetrahydrophthalic acid, nadic acid and HET acid.

As the polycarboxylic acid without a polymerizable unsaturated bond, there can be used, for example, phthalic acid, isophthalic acid, terephthalic acid, adipic acid, sebacic acid or a derivative of these.

As the polyol raw material of the unsaturated polyester resin, there can be used ethylene glycol, propylene glycol, diethylene glycol, dipropylene glycol, neopentyl glycol, 1,3-butanediol, 1,6-hexanediol, bisphenol A, tetrabromobisphenol A, hydrogenated bisphenol A, dibromoneopentylglycol, bisphenol A/propylene oxide adduct, pentaerythritol diallyl ether and the like.

Unsaturated polyester resins are marketed as a pure product or as a solution diluted with styrene or the like.

As examples of commercially available pure products, there can be used "Atlac" 382E, "Dion" 6694G, and "Atlac" 711A (made by Reichold Chemicals Inc.) and, as examples of styrene solutions, there can be used "Upica" 5524P (made by Nippon Upica), "Polylite" FG-104 (made by Dainippon Ink & Chemicals Inc.), "Estar" R2110 (made by Mitsui Toatsu Chemicals Inc.), "Epolac" G-110AL (made by the Nippon Shokubai Co.), "Polymal" P-503 (made by Takeda Chemical Industries Ltd.), "Rigolac" 1557 (made by the Showa Highpolymer Co.) and "Polyset" 6120 (made by Hitachi Chemical Co. Ltd.).

A second specific example of a component (A) with ester linkages is a vinyl ester resin. As vinyl ester resins, there can be used the ester compounds obtained by the addition of a monocarboxylic acid with a polymerizable unsaturated bond to a compound with a plurality of epoxy groups (an epoxy resin).

As the epoxy resin raw material of the vinyl ester resin, there can be used bisphenol A diglycidyl ether, tetrabromobisphenol A diglycidyl ether, resorcinol diglycidyl ether, novolak diglycidyl ether, phthalic acid diglycidyl ester, tetraglycidyl-m-phenylenediamine or the like.

As the monocarboxylic acid with a polymerizable unsaturated bond which comprises a raw material for the vinyl ester resin, there can be used acrylic acid or methacrylic acid.

An alternative known method for the synthesis of a vinyl ester resin is the method of reacting glycidyl acrylate or glycidyl methacrylate with a polyphenol or amine compound. For example, if glycidyl methacrylate is reacted with bisphenol A, there is obtained the same reaction product as the reaction product of bisphenol A diglycidyl ether and methacrylic acid.

Vinyl ester resins are marketed as pure products or as solutions diluted with styrene or the like. As examples of vinyl esters based on bisphenol A diglycidyl ether as the raw material, there are the pure products "Epoxyester" 3000A and "Epoxyester" 3000M (made by the Kyoeisha Chemical Co.) and the styrene solutions "Ripoxy" R-803 (made by the Showa Highpolymer Co.), "Neopol" 8250 (made by Nippon Upica), "Estar" H6700 (made by Mitsui Toatsu Chemicals Inc.) and "Derakane" 411–45 (made by Dow Plastics).

As examples of styrene solutions of vinyl esters based on a novolak glycidyl ether as raw material, there can be used "Ripoxy" H-600 (made by the Showa Highpolymer Co.), "Neopol" 8411 (made by Nippon Upica), "Estar" H8100 (made by Mitsui Toatsu Chemicals Inc.) and "Derakane" 470–300 (made by Dow Plastics).

As examples of styrene solutions of vinyl esters based on tetrabromobisphenol A diglycidyl ether as raw material, there can be used "Ripoxy" S-510 (made by the Showa Highpolymer Co.), "Neopol" 8190 (made by Nippon Upica) and "Derakane" 510A-40 (made by Dow Plastics).

A third specific example of component (A) with ester linkages is an allyl resin. Allyl resins are allyl esters of polycarboxylic acids or oligomers thereof. As the polycarboxylic acid, there is used phthalic acid, isophthalic acid, tetrabromophthalic acid or the like. Diallyl phthalate and diallyl isophthalate are marketed by the Osaka Soda Co.

Besides these, 1,6-hexanediol diacrylate, trimethylolpropane triacrylate and the like can also be used as component (A) with ester linkages.

Furthermore, as component (A) without ester linkages, there can be used triallyl isocyanurate, divinylbenzene and the like.

In the case where compositional element (A) is a compound with a plurality of polymerizable unsaturated bonds in the molecule, there is used as component (B) a compound having one polymerizable unsaturated bond and one or more moiety selected from formulae (1) to (4) in the molecule.

A compound with a structure represented by formula (5) is preferably used as said component (B).

As the compound with a structure represented by formula (5), there can be used a compound represented by general formula (10), or maleimide or a maleimide derivative having an alkyl group or aryl group substituent.

As said component (B), there can also be used the compounds represented by general formulae (8), (9) and (11).

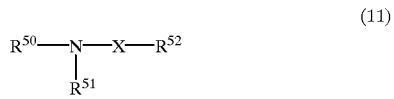

(11)

(Here, X represents one of the following,

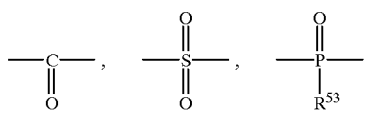

where $R^{53}$ represents an alkyl group or aryl group.

$R^{50}$ represents an alkenyl group, $R^{51}$ represents hydrogen, an alkyl group, an aryl group, —$WR^{54}$, —W—$OR^{55}$ or —W—$NR^{56}R^{57}$, where $R^{54}$ and $R^{55}$ each represent an alkyl group or aryl group, $R^{56}$ and $R^{57}$ each represent hydrogen, an alkyl group or an aryl group, and W represents —CO— or —$SO_2$—.

$R^{52}$ represents an alkyl group, an aryl group, —$OR^{58}$ or —$NR^{59}R^{60}$. $R^{58}$ represents an alkyl group or an aryl group, $R^{59}$ represents hydrogen, an alkyl group or an aryl group, $R^{60}$ represents hydrogen, an alkyl group, an aryl group, —$VR^{61}$, —V—$OR^{62}$ or —V—$NR^{63}R^{64}$, where $R^{61}$ and $R^{62}$ each represent an alkyl group or aryl group, $R^{63}$ and $R^{64}$ each represent hydrogen, an alkyl group or aryl group, and V represents —CO— or —$SO_2$—.

The aforesaid alkyl groups, aryl groups and alkylene groups may also have substituent groups selected from alkyl groups, aryl groups, halogens and alkoxy groups. In addition, any two of $R^{50}$, $R^{51}$ and $R^{52}$ may form a ring.)

As specific examples of the compounds represented by general formula (11), there are N-allylacetamide, N-allylbenzamide, N-vinylpyrrolidone, N-allylsuccinimide, allylurea, 1-allyl-3-phenylurea, 1-allylhydantoin, phenyl allylcarbamate, allylthiourea, N-allyltoluenesulphonamide, methanesulphinic acid allyl amide.

There can also be used, as component (B), allyl phenylcarbamate, acrolein semicarbazone and the like In the case where component (A) is a compound with a plurality of polymerizable unsaturated bonds in the molecule, the thermoplastic resin composition for fiber reinforced composite materials of the present invention can contain a component (F), which is a polymerizable monomer having one polymerizable unsaturated bond in the molecule but which, unlike component (B), does not contain a structure selected from the formulae (1) to (4). Said component (F) is a useful component for adjustment of the viscosity. As specific examples of component (F), there are styrene, vinyltoluene, chlorostyrene, methyl methacrylate, butyl methacrylate and the like. Of these, styrene is preferably employed.

The preferred blending ratios of components (A), (B) and (F) in the thermosetting resin composition in the case where component (F) is employed are as follows.

(A)/[(A)(B)+(F)]=0.3 to 0.8

(B)/[(A)(B)+(F)]=0.05 to 0.4

(F)/[(A)(B)+(F)]=0 to 0.6

In the case where component (A) is a compound containing a plurality of polymerizable unsaturated bonds in the molecule, the thermosetting resin composition for fiber reinforced composite materials of the present invention will contain a component (D), namely a thermolytic polymerization initiator. This undergoes decomposition by thermal reaction, generating radicals, and has the function of initiating the radical polymerization of components (A), (B) and (F). Organic peroxides are preferably used as said component (D). Reference here to an organic peroxide is to an organic compound having an oxygen—oxygen bond.

There can be used as said organic peroxide, for example, benzoyl peroxide, methyl ethyl ketone peroxide, cyclohexanone peroxide, methyl acetoacetate peroxide, acetylacetone peroxide, cumene hydroperoxide, dicumyl peroxide, 1,1-bis(t-butylperoxy)-3,3,5-trimethylcyclohexane, bis(4-t-butylcyclohexyl)peroxydicarbonate, t-butyl peroxybenzoate, t-butyl peroxypivalate, t-butyl-peroxy-2-ethylhexanoate or t-butylhydroperoxide.

As well as the aforesaid organic peroxides, azo compounds such as azobisisobutyronitrile and 2,2-azobis(4-methoxy-2,4-dimethylvaleronitrile) can also be used as said component (D).

In the thermosetting resin composition of the present invention, along with component (D), there may be included component (E), which is an accelerator therefor. This component (E) is not an essential component but, when said component (F) is also present, the rate of decomposition of component (F) is considerably increased compared to when it is used alone. For example, in the case where the thermosetting resin composition is to be cured at a temperature of 80° C. or below, a formulation employing both component (D), which has comparatively good thermal stability, and component (E) is useful.

As said component (E), there is preferably used a cobalt salt, for example cobalt naphthenate, cobalt octanoate or cobalt stearate.

There can also be incorporated into the thermosetting resin composition of the present invention an accelerator auxiliary for controlling the acceleration action of component (E). As this accelerator auxiliary, there can be used acetylacetone, N,N-dimethylacetoacetamide, dimedone, dibenzoylmethane, 2-acetylcyclopentanone, ethyl acetoacetate or other such 1,3-dicarbonyl compound, dimethylaniline or other such aromatic tertiary amine, triphenylphosphine or a metal (e.g. calcium, strontium, barium or manganese) salt of carboxylic acid.

In the case where component (A) is a compound with a plurality of polymerizable unsaturated groups in the molecule, there can also be incorporated a polymerization inhibitor into the thermosetting resin composition of the present invention for the purposes of enhancing the storage stability and the period of possible use. As said polymerization inhibitor, there can be used, for example, p-benzoquinone, 2,5-diphenyl-p-benzoquinone, hydroquinone, t-butylhydroquinone, trimethylhydroquinone, 2,5-di-t-butylhydroquinone, p-t-butylcatechol, t-butylhydroxyanisole (BHA) or di-t-butylhydroxytoluene (BHT).

Phenolic resins can also be used as component (A). As the phenolic resins, those with a hydroxymethyl group, that is to say resol resins, are preferably employed. In such circumstances, as component (B) there is preferably used a phenol derivative having a structure selected from formulae (1) to (4) in a substituent group. In this case, the benzene ring with a hydroxyl group corresponds to the functional group which reacts with the resol resin. Specifically, there can be used salicylamide, 4-hydroxybenzamide, 4-hydroxyphenylacetamide, 4-hydroxyacetanilide, 3-hydroxyacetanilide, N-acetyltyramine and the like.

It is also possible to incorporate other components such as polymer compounds, organic or inorganic particles, dyes, surfactants, release agents, waxes and the like as optional components in the thermosetting resin composition of the present invention.

As polymer compounds, thermoplastic resins are desirably used. By incorporating a thermoplastic resin, resin viscosity control, prepreg workability control, and the adhesion improving effect between matrix resin and reinforcing fiber are promoted.

It is particularly preferred that the thermoplastic resin employed here has functional groups which undergo hydrogen bonding, in that there can be expected a synergistic effect in terms of the improvement in adhesion to the reinforcing fiber, which is the objective of the invention.

Examples of hydrogen bonding groups are the alcoholic hydroxyl group, the amide linkage and the sulphonyl group.

As examples of thermoplastic resins with alcoholic hydroxyl groups, there are polyvinyl acetal resins such as polyvinyl formal and polyvinyl butyral, polyvinyl alcohol and phenoxy resins; as examples of thermoplastic resins with amide linkages, there are polyamides and polyimides; and as an example of thermoplastic resins with sulphonyl groups, there are polysulphones. The polyamides, polyimides and polysulphones may also have functional groups such as ether linkages and carbonyl groups in the main chain. In the case of polyamides, the amide group nitrogen atom may have a substituent group.

As examples of commercial thermoplastic resin products which are epoxy resin-soluble and which have hydrogen bonding groups, there are, in the case of the polyvinyl acetal resins, "Denka Butyrai" and "Denka Formal" (made by Denki Kagaku Kogyo K.K.) and "Vinylek" (made by the Chisso Corp.); in the case of phenoxy resins, "UCAR" PKHP (made by Union Carbide); in the case of polyamide resins, "Macromelt" (made by the Henkel Hakusui Corp.) and "Amilan" CM4000 (made by Toray Industries); in the case of polyimides, "Ultem" (made by General Electric) and "Matrimid" 5218 (made by Ciba); and in the case of polysulphones, "Victrex" (made by Mitsui Toatsu Chemicals Inc.) and "Udel" (made by Union Carbide).

Where there is included a thermoplastic resin, using from 1 to 20 parts by weight thereof per 100 parts by weight of the thermosetting resin (A) is preferred in terms of providing suitable viscoelasticity and obtaining good composite material properties.

Rubber particles and thermoplastic resin particles are used as the organic particles incorporated into the thermosetting resin composition of the present invention. These particles have the effect of enhancing the resin toughness and raising the impact resistance of the fiber reinforced composite material.

Crosslinked rubber particles, and core-shell rubber particles in which some other polymer has been graft polymerized to the surface of crosslinked rubber particles, are preferably used as the rubber particles.

As examples of commercial crosslinked rubber particles, there are XER-91 (made by the Japan Synthetic Rubber Co.) which comprises a carboxyl-modified butadiene-acrylonitrile crosslinked copolymer, and the CX-MN series (made by Nippon Shokubai Co.) and the YR-500 series (made by the Tohto Kasei Co.) which comprise acrylic rubber fine particles.

As examples of commercial core-shell rubber particles, there are "Paraloid" EXL-2655 (made by the Kureha Chemical Industry Co.) which comprises a butadiene/alkyl methacrylate/styrene copolymer, "Staphyloid" AC-3355 and TR-2122 (made by Takeda Chemical Industries) which are acrylate ester/methacrylate ester copolymers, and "Paraloid" EXL-2611 and EXL-3387 (made by Rohm & Haas) which comprise a butyl acrylate/methyl methacrylate copolymer.

Polyamide or polyimide particle are preferably used as the thermoplastic resin particles. As examples of commercial polyamide particles, there are SP-500 made by Toray and "Orgasol" made by Atochem.

As inorganic particles, there can be incorporated silica, alumina, smectite, synthetic mica and the like. These inorganic particle are incorporated primarily for the purpose of rheology control, that is to say for raising the viscosity or conferring plasticity or thixotropy.

Organic and inorganic particles are also incorporated for the purposes of coloration.

In order to raise the 0° compressive strength or the 90° tensile strength of the fiber reinforced composite material, it is preferred that, as well as raising the viscosity between the resin and reinforcing fiber, the elastic modulus and tensile elongation of the cured resin composition also be high. The flexural modulus of the cured material is preferably at least 3.2 GPa, with at least 3.5 GPa being still further preferred. Again, the tensile elongation of the cured material is preferably at least 8%, with at least 10% being still further preferred.

Carbon fiber is used as the reinforcing fiber in the fiber reinforced composite materials of the present invention but there is no objection to using a mixture with glass fiber, aramid fiber, boron fiber, alumina fiber, silicon carbide fiber or the like, or a mixture with more than one type of these. However, it is preferred that the reinforcing fiber be mainly carbon fiber in order to obtain molded articles of lower weight and higher durability. Moreover, in order to produce still lighter sports equipment such as golf shafts and fishing rods, it is preferred that a high modulus carbon fiber be used in the prepreg so that sufficient product stiffness is achieved with a small amount of the material. It is preferred that the elastic modulus of such carbon fiber be at least 200 GPa, with from 210 to 800 GPa being still further preferred.

Various known methods are used in the production of the fiber reinforced composite materials of the present invention.

As a method which is suitable for the production of sports equipment such as golf shafts, fishing rods, rackets and the like, or for the component parts of aircraft and artificial satellites, there is the method of preparing a prepreg by the impregnation of the reinforcing fiber with the epoxy resin composition, then laminating this prepreg and heating and curing, to obtain the fiber reinforced composite material.

The form and the arrangement of the reinforcing fiber used in the prepreg is not particularly restricted and there can be used, for example, unidirectionally collimated continuous fiber, single tow, woven fabric, mat, knit, braid or the like.

The prepreg can be produced by, for example, the wet method in which the thermosetting resin composition is dissolved in a solvent such as methyl ethyl ketone or methanol, to lower the viscosity, after which impregnation is effected, or by the hot melt method in which the viscosity of the resin is lowered by heating and then impregnation effected.

The wet method is a method in which, following the impregnation of the reinforcing fiber with the epoxy resin of reduced viscosity, it is withdrawn and the solvent evaporated off using an oven or the like.

In the hot melt method, the prepreg is produced either by directly impregnating the reinforcing fiber with the epoxy resin composition which has been heated to reduce its viscosity, or alternatively coated film of the epoxy resin composition is firstly produced on release paper or the like, and then said film placed on one or both sides of the reinforcing fiber and heat and pressure applied to effect impregnation of the resin. The hot melt method is preferred in that there is no residual solvent in the prepreg.

The molding of the composite using the prepreg can be carried out for example by laminating of the prepreg, after which the resin is heated and cured while applying pressure to the laminated material.

For the purposes of applying heat and pressure, there can be used the press method, autoclave method, bagging method, wrapping tape method or internal pressure method, with the wrapping tape method and the internal pressure method being particularly preferred for sports equipment.

The wrapping tape method is a method in which the prepreg is wound onto a mandrel or the like, to form a cylindrically shaped article, and this method is preferably used when producing rod-shaped bodies such as a golf shaft or fishing rod. Specifically, the prepreg is wound around the mandrel and then, in order to fix the prepreg and apply pressure, wrapping tape comprising a thermoplastic film is wound around the outside of the prepreg. After heating and curing the resin in an oven, the mandrel is removed and a cylindrically-shaped molded body obtained.

The internal pressure method is a method in which a preform, produced by winding a prepreg onto a bladder comprising a thermoplastic resin tube or the like, is set in a mold and then, at the same time as applying pressure by the introduction of a high pressure gas into the bladder, the mold is heated and molding performed. This method is suitably used for the molding of complex shaped articles such as golf shafts, bats, and tennis, badminton and other types of racket.

When using the thermosetting resin composition of the present invention for a prepreg, if the viscosity is low then prepreg shape retention is difficult or suitable tackiness is not obtained. Again, if the viscosity is high, the complex viscosity in the case where dynamic viscoelasticity measurement is carried out at 25° C. and 0.5 Hz is preferably from 10,000 to 300,000 Pa.s, with the range from 50,000 to 300,000 being still further preferred.

Furthermore, fiber reinforced composite materials can also be prepared by methods which do not employ a prepreg, whereby the reinforcing fiber is directly impregnated with the thermosetting resin composition of the present invention and then heating and curing performed, for example by means of a molding method such as a hand lay-up method, filament winding method, pultrusion method or liquid composite molding method. With these, the thermosetting resin composition can be prepared directly before use.

Liquid composite molding methods are methods for producing a fiber reinforced composite material by injecting the thermosetting resin composition in the liquid state into a preform comprising the reinforcing fiber. On account of their good productivity and the fact that it is possible to mold complex-shaped members, these are important molding methods industrially. Liquid composite molding methods include the RTM method, the SRIM method, the VaRTM method and the SCRIMP method, etc.

In cases where the thermosetting resin composition of the present invention is used in a liquid composite molding method, a low viscosity is preferred. This is because, if the viscosity is high, the injection takes time and productivity is lowered. Moreover, if the injection takes too long a time, the resin viscosity increases due to thermal reaction during the injection process and the resin fluidity is impaired, so that the molding itself becomes impossible. In the measurement of the viscosity of such low viscosity resins, it is appropriate to use a rotational viscometer. Specifically, the viscosity measured at 25° C. and 60 rpm using a rotational viscometer is preferably from 0.01 to 1.0 Pa.s and more preferably from 0.01 to 0.7 Pa.s.

Again, in the case where the thermosetting resin composition of the present invention is used in a liquid composite molding method, ideally it is a Newtonian fluid and it is preferred that the shear rate dependency of the apparent viscosity be low. Moreover, it is also preferred that the thixotropy, that is to say the property whereby the apparent viscosity depends on the shear rate history, be low. Consequently, it is preferred that it does not contain particles such as fumed silica, smectite or carbon black which enhance thixotropy. This is because resins of the kind where the apparent viscosity is markedly dependent on the shear rate or shear rate history take time to impregnate the preform, so unimpregnated regions are readily produced. With regard to the shear rate dependency of the apparent viscosity, the ratio of the apparent viscosity measured using a rotational viscometer at 6 rpm to the apparent viscosity measured at 60 rpm is preferably no more than 2.0 and still more preferably no more than 1.4.

Moreover, in the case of the filament winding method and hand lay up method, impregnation is mostly carried out at room temperature so, in the same way, the viscosity measured at 25° C. and 60 rpm using a rotational viscometer is preferably from 0.01 to 1.0 Pa.s and more preferably from 0.01 to 0.7 Pa.s.

Since there is outstanding adhesion between the reinforcing fiber and the matrix resin, the fiber reinforced composite materials of the present invention are outstanding in their various properties, as described below.

The fiber reinforced composite materials of the present invention are outstanding in the 0° tensile strength of a unidirectional fiber reinforced composite material using continuous fiber. This effect is marked in the case where the elongation of the matrix resin is high. This is because of the effect of preventing the propagation of microcracks due to local fiber fracture.

The fiber reinforced composite materials of the present invention are outstanding in the 0° compressive strength and 0° flexural strength of a unidirectional fiber reinforced composite material using continuous fiber. This effect is marked in the case where the modulus of the matrix resin is high. This is because of the effect of preventing Euler buckling of the reinforcing fiber.

The fiber reinforced composite materials of the present invention are outstanding in the 90° tensile strength and 90° flexural strength of a unidirectional fiber reinforced composite material using continuous fiber. This effect is marked in the case where the elongation of the matrix resin is high. This is because of the effect of preventing separation between the reinforcing fiber and matrix.

The fiber reinforced composite materials of the present invention are outstanding in their shear strength, for example in their interlaminar shear strength and in-plane shear strength. This is because of the effect of preventing separation between the reinforcing fiber and matrix. For the same reason, the mode II interlayer fracture toughness measured by the end notched flexure method is also excellent.

Even where the fiber reinforced composite materials of the present invention have a structure other than that of a unidirectional fiber reinforced composite material, or in the case of reinforcement with short fiber, they are generally outstanding in their tensile, compression, flexural and shear strengths.

In sports applications or general industrial applications, hollow cylindrically-shaped composite materials are often employed, and for these too striking effects are to be seen in their torsional strength and radial compressive strength.

In the case of a fiber reinforced composite material in which the reinforcing fiber is short fiber, there is also the effect that, in addition to strength, the stiffness is improved.

The fiber reinforced composite materials of the present invention are also outstanding in their impact resistance, for example in their Charpy impact strength and in their compressive strength after impact (CAI).

The fiber reinforced composite materials of the present invention are favourably employed in sports applications as golf shafts, fishing rods, tennis, badminton, squash and other rackets, hockey and other sticks, ski poles and the like.

In aerospace applications, they are favourably employed as aircraft primary structural materials (main wings, tail wing, floor beam, etc), secondary structural materials (flap, aileron, cowl, fairing, interior trim, etc), rocket motor cases, structural materials for artificial satellites, and the like.

In general industrial applications, they are favourably employed as structural materials for moving bodies such as cars, boats and railway carriages, drive shafts, plate springs, wind turbine blades, pressure vessels, fly-wheels, papermaking rollers, civil engineering and building materials (roofing materials, cables, reinforcing bars, retrofitting materials) and the like.

EXAMPLES

Below, the present invention is explained in detail by means of examples.

In Examples 1 to 11 and Comparative Examples 1 to 7, the measurement of the resin viscoelasticity and of the properties of the cured resin, the preparation of the prepreg, the preparation of the unidirectional composite material, the measurement of the properties of the unidirectional composite material, the preparation of the cylindrical composite material, and the measurement of the properties of the cylindrical composite material, were carried out as follows. Now, the measurements of the mechanical properties were all carried out in an environment of temperature 23° C. and relative humidity 50%.

(1) Dynamic Viscoelasticity Measurement of the Resin

Using a Rheometrix Scientific Co. viscoelasticity measurement instrument ARES, the complex viscosity $\eta^*$ was determined at a temperature of 25° C. and at a frequency of 0.5 Hz.

(2) Measurement of the Properties of the Cured Resin

A. Measurement of the tensile elongation

The resin composition was heated to 80° C., poured into a mold, and then subjected to thermosetting for 2 hours in a hot air dryer at 135° C. to prepare a cured resin sheet of thickness 2 mm. Next, in accordance with JIS-K7113, Type 1 (½) small-size test pieces were cut out from the cured resin sheet and the tensile elongation determined.

B. Measurement of the Flexural Modulus

From a cured resin sheet prepared in the same way as in A, test pieces of width 10 mm and length 60 mm were cut out. A three-point bending test was carried out at a testing rate of 2.5 mm/min and a span length of 32 mm, and the flexural modulus determined in accordance with JIS-K7203.

(3) Preparation of the Prepreg

The resin composition was applied onto release paper using a reverse roll coater, to prepare resin film. Next, carbon fiber "Torayca" T800HB-12K-40B (made by Toray Industries Inc.) which had been unidirectionally arranged in the form of a sheet was interposed between two layers of the resin film, and then heat and pressure applied to effect impregnation of the resin composition. In this way, there was prepared a unidirectional prepreg of carbon fiber aerial weight 125 g/m$^2$ and resin content by weight 24%.

(4) Preparation of the Unidirectional Composite Material

A specified number of sheets of the unidirectional prepreg were superimposed with the reinforcing fiber direction the same in each case, and then curing carried out by applying heat and pressure for 2 hours in an autoclave at a temperature of 135° C. and a pressure of 290 Pa, to produce a unidirectional composite material.

(5) Measurement of the Properties of the Unidirectional Composite Material

A. Measurement of the 0° Compressive Strength

Test pieces of width 12.7 mm and length 79.4 mm were prepared from a unidirectional composite material obtained by the laminating of 11 sheets of the unidirectional prepreg, and then the 0° compressive strength measured, in accordance with ASTM D690.

B. Measurement of the 90° Tensile Strength and the 90° Elongation

Test pieces of width 25.4 mm and length 38.1 mm were prepared from a unidirectional composite material obtained by the laminating of 22 sheets of the unidirectional prepreg. Then, tensile testing was carried out and the 90° tensile elongation and the 90° tensile strength measured, in accordance with ASTM D3039.

C. Measurement of the 0° Interlaminar Shear Strength (ILSS)

Test pieces of width 6.4 mm and length 14 mm were prepared from a unidirectional composite material obtained by the laminating of 22 sheets of the unidirectional prepreg. Then, a three-point bending test was carried out and measurement performed of the 0° interlaminar shear strength (ILSS), in accordance with ASTM D2344.

(6) Preparation of a Cylindrical Composite Material

By the procedure described in (a) to (e) below, two types of cylindrical composite material of internal diameter 6.3 mm and 10 mm respectively, and having a [0$_3$/±45$_3$] laminate structure in terms of the cylinder axis direction, were prepared. As mandrels, there were used stainless steel round rods of diameter 6.3 mm and 10 mm (both of length 1000 mm).

(a) From the unidirectional prepreg, two rectangular sheets were cut out of size 800 mm length×68 mm width in the case of the mandrel of diameter 6.3 mm, and size 800 mm length×103 mm width in the case of the mandrel of diameter 10 mm, such that the direction of the carbon fiber was at 45° to the mandrel axis direction. These two sheets were stuck together in such a way that the fiber direction mutually crossed, but staggered in the widthwise direction at 10 mm in the case of the mandrel of diameter 6.3 mm and at 16 mm in the case of the mandrel of diameter 10 mm (corresponding in each case to half the mandrel circumference).

(b) The mutually stuck-together prepreg was then wound onto the release-treated mandrel in such a way that the lengthwise direction of the prepreg matched the mandrel axial direction.

(c) On top of this, prepreg which had been cut (with the direction of the fiber lying in the lengthwise direction) to a rectangular shape of 800 mm length×77 mm width in the case of the mandrel of diameter 6.3 mm, and 800 mm length×112 mm width in the case of the mandrel of diameter 10 mm, was wound around in such a way that prepreg lengthwise direction matched the mandrel axial direction.

(d) Wrapping tape (heat resistant film tape) was then wound round and hot molding carried out for 2 hours at 130° C. in a curing oven.

(e) After molding, the mandrel was extracted, then the wrapping tape removed, and the cylindrical composite material obtained.

(7) Measurement of the Properties of the Cylindrical Composite Material

A. Measurement of the Flexural Failure Load

Using the cylindrical composite material of internal diameter 10 mm, the flexural failure load was measured based on the three-point bending test described in "Qualification Standards and Standard Confirmation Methods for Shafts for Golf Clubs" (Ed. by the Consumer Product Safety Committee, Minister for International Trade and Industry, Approval No. 5-SAN-2087, 1993). The span length was 300 mm and the testing rate was 5 mm/min.

B. Measurement of the Torsional Strength

Test pieces of length 400 mm were cut from the cylindrical composite material of internal diameter 10 mm, and torsional testing carried out in accordance with the method described in "Qualification Standards and Standard Confirmation Methods for Shafts for Golf Clubs" (Ed. by the Consumer Product Safety Committee, Minister for International Trade and Industry, Approval No. 5-SAN-2087, 1993). The test piece gauge length was made 300 mm, with 50 mm at each end of the test piece being gripped by the clamping jigs. The torsional strength was calculated from the following formula.

torsional strength (N.m.deg)=failure torque (N.m)×angle of torsion at failure (deg)

C. Measurement of the Radial Compressive Failure Load

A test piece of length 15 mm was cut out from the cylindrical composite material of internal diameter 10 mm, then a compressive load applied in the radial direction of the cylinder via a flat stainless steel plate until failure occurred. The load at the time of failure was taken as the compressive failure load. The testing rate was 5 mm/min.

D. Measurement of the Charpy Impact Absorption Energy

Charpy impact testing was conducted by the method described in JIS-K7077, excepting that there was used a cylindrical composite material as the test piece. A test piece of length 90 mm was cut from the cylindrical composite material of internal diameter 6.3 mm and then, using a span length of 40 mm, a hammer swing angle of 135° and a capacity 300 kg.cm, an impact was applied from a direction perpendicular to the cylinder axis direction and the absorbed energy measured.

Some examples and comparative examples will now be explained. References to 'parts' in these examples and comparative examples all denote 'parts by weight'. The examples and comparative examples are shown together in Table 1 and Table 2.

Example 1

This shows an example of the use of N,N-dimethylacrylamide as component (B). The following raw materials were mixed together in a kneader and a resin composition obtained.

| | |
|---|---|
| bisphenol A type epoxy resin ("Epikote" 828, made by Yuka Shell Epoxy K.K.) | 40 parts |
| bisphenol A type epoxy resin ("Epikote" 1001, made by Yuka Shell Epoxy K.K.) | 40 parts |
| brominated bisphenol A type epoxy resin ("Epiclon" 152, made by Dainippon Ink & Chemicals Inc.) | 10 parts |
| tetraglycidyldiaminodiphenylmethane ("Sumi-epoxy" ELM434, made by the Sumitomo Chemical Co.) | 10 parts |
| dicyandiamide (DICY7, made by Yuka Shell Epoxy K.K.) | 5 parts |
| 3-(3,4-dichlorophenyl)-1,1-dimethylurea (DCMU99, made by the Hodogaya Chemical Co.) | 3 parts |
| N,N-dimethylacrylamide (made by the Kohjin Co.) | 5 parts |
| polyvinyl formal ("Vinylek" K, made by the Chisso Corp.) | 7 parts |

Using this resin composition, and employing the methods described above, cured resin, unidirectional composite material and cylindrical composite material were prepared and their properties measured. The measurement results are shown in Table 1.

Example 2

The following raw materials were mixed together in a kneader and a resin composition obtained.

| | |
|---|---|
| bisphenol A type epoxy resin ("Epikote" 828, made by Yuka Shell Epoxy K.K.) | 40 parts |
| bisphenol A type epoxy resin ("Epikote" 1001, made by Yuka Shell Epoxy K.K.) | 40 parts |
| brominated bisphenol A type epoxy resin ("Epiclon" 152, made by Dainippon Ink & Chemicals Inc.) | 10 parts |
| tetraglycidyldiaminodiphenylmethane ("Sumi-epoxy" ELM434, made by the Sumitomo Chemical Co.) | 10 parts |
| dicyandiamide (DICY7, made by Yuka Shell Epoxy K.K.) | 5 parts |
| 3-(3,4-dichlorophenyl)-1,1-dimethylurea (DCMU99, made by the Hodogaya Chemical Co.) | 3 parts |
| N,N-dimethylacrylamide (made by the Kohjin Co.) | 3 parts |
| polyvinyl formal ("Vinylek" K, made by Chisso Corp.) | 7 parts |

Using this resin composition, and employing the methods described above, cured resin, unidirectional composite material and cylindrical composite material were prepared and their properties measured. The measurement results are shown in Table 1.

Example 3

The following raw materials were mixed together in a kneader and a resin composition obtained.

| | |
|---|---|
| bisphenol A type epoxy resin | 40 parts |
| ("Epikote" 828, made by Yuka Shell Epoxy K.K.) | |
| bisphenol A type epoxy resin | 40 parts |
| ("Epikote" 1001, made by Yuka Shell Epoxy K.K.) | |
| brominated bisphenol A type epoxy resin | 10 parts |
| ("Epiclon" 152, made by Dainippon Ink & Chemicals Inc.) | |
| tetraglycidyldiaminodiphenylmethane | 10 parts |
| ("Sumi-epoxy" ELM434, made by the Sumitomo Chemical Co.) | |
| dicyandiamide | 5 parts |
| (DICY7, made by Yuka Shell Epoxy K.K.) | |
| 3-(3,4-dichlorophenyl)-1,1-dimethylurea | 3 parts |
| (DCMU99, made by the Hodogaya Chemical Co.) | |
| N,N-dimethylacrylamide | 2 parts |
| (made by the Kohjin Co.) | |
| polyvinyl formal | 7 parts |
| ("Vinylek" K, made by Chisso Corp.) | |

Using this resin composition, and employing the methods described above, cured resin, unidirectional composite material and cylindrical composite material were prepared and their properties measured. The measurement results are shown in Table 1.

Comparative Example 1

This shows an example where there was used a resin composition comprising the components of the resin compositions in Examples 1 to 3 but with component (B) removed.

The following raw materials were mixed together in a kneader and a resin composition obtained.

| | |
|---|---|
| bisphenol A type epoxy resin | 40 parts |
| ("Epikote" 828, made by Yuka Shell Epoxy K.K.) | |
| bisphenol A type epoxy resin | 40 parts |
| ("Epikote" 1001, made by Yuka Shell Epoxy K.K.) | |
| brominated bisphenol A type epoxy resin | 10 parts |
| ("Epiclon" 152, made by Dainippon Ink & Chemicals Inc.) | |
| tetraglycidyldiaminodiphenylmethane | 10 parts |
| ("Sumi-epoxy" ELM434, made by the Sumitomo Chemical Co.) | |
| dicyandiamide | 5 parts |
| (DICY7, made by Yuka Shell Epoxy K.K.) | |
| 3-(3,4-dichlorophenyl)-1,1-dimethylurea | 3 parts |
| (DCMU99, made by the Hodogaya Chemical Co.) | |
| polyvinyl formal | 7 parts |
| ("Vinylek" K, made by Chisso Corp.) | |

Using this resin composition, and employing the methods described above, cured resin, unidirectional composite material and cylindrical composite material were prepared and their properties measured. The measurement results are shown in Table 1. The unidirectional composite material 0° compressive strength, 90° tensile strength, 90° tensile elongation and 0° interlaminar shear strength, and the cylindrical composite material flexural failure load, torsional strength, compressive failure load and Charpy impact absorption energy were all inferior when compared to Examples 1 to 3.

Comparative Example 2

This shows an example where, instead of component (B) in Examples 1 to 3, there was used a compound (N-octylpyrrolidone) containing an amide linkage but which does not contain a functional group which can react with the epoxy resin or its curing agent.

The following raw materials were mixed together in a kneader and a resin composition obtained.

| | |
|---|---|
| bisphenol A type epoxy resin | 40 parts |
| ("Epikote" 828, made by Yuka Shell Epoxy K.K.) | |
| bisphenol A type epoxy resin | 40 parts |
| ("Epikote" 1001, made by Yuka Shell Epoxy K.K.) | |
| brominated bisphenol A type epoxy resin | 10 parts |
| ("Epiclon" 152, made by Dainippon Ink & Chemicals Inc.) | |
| tetraglycidyldiaminodiphenylmethane | 10 parts |
| ("Sumi-epoxy" ELM434, made by the Sumitomo Chemical Co.) | |
| dicyandiamide | 5 parts |
| (DICY7, made by Yuka Shell Epoxy K.K.) | |
| 3-(3,4-dichlorophenyl)-1,1-dimethylurea | 3 parts |
| (DCMU99, made by the Hodogaya Chemical Co.) | |
| N-octylpyrrolidone | 5 parts |
| (Aldrich Chemical Co.) | |
| polyvinyl formal | 7 parts |
| ("Vinylek" K, made by the Chisso Corp.) | |

Using this resin composition, and employing the methods described above, cured resin, unidirectional composite material and cylindrical composite material were prepared and their properties measured. The measurement results are shown in Table 1. The flexural modulus and tensile elongation of the cured resin, the 0° compressive strength, 90° tensile strength, 90° tensile elongation and 0° interlaminar shear strength of the unidirectional composite material, and the flexural failure load, torsional strength, compressive failure load and Charpy impact absorption energy of the cylindrical composite material were all inferior when compared to Examples 1 to 3.

TABLE 1

| | Example 1 | Example 2 | Example 3 | Comp. Example 1 | Comp. Example 2 |
|---|---|---|---|---|---|
| Component (A) | | | | | |
| "Epikote" 828 | 40 | 40 | 40 | 40 | 40 |
| "Epikote" 1001 | 40 | 40 | 40 | 40 | 40 |
| "Epiclon" 152 | 10 | 10 | 10 | 10 | 10 |
| "Sumi-epoxy" ELM434 | 10 | 10 | 10 | 10 | 10 |
| "Epikote" YX4000H | — | — | — | — | — |
| Component (C) | | | | | |
| dicyandiamide (curing auxiliary) | 5 | 5 | 5 | 5 | 5 |
| 3-(3,4-dichlorophenyl-1,1-dimethylurea) | 3 | 3 | 3 | 3 | 3 |

TABLE 1-continued

|  | Example 1 | Example 2 | Example 3 | Comp. Example 1 | Comp. Example 2 |
|---|---|---|---|---|---|
| Component (B) |  |  |  |  |  |
| N,N-dimethylacrylamide | 5 | 3 | 2 | — | — |
| acrylamide |  |  |  | — | — |
| acryloylmorpholine |  |  |  | — | — |
| N-hydroxymethylacrylamide |  |  |  | — | — |
| N-glycidylphthalimide |  |  |  | — | — |
| p-hydroxyphenylacetamide |  |  |  | — | — |
| Compound with an amide group but no reactive functional group |  |  |  |  |  |
| N-octylpyrrolidone | — | — | — | — | 5 |
| Thermoplastic resin (polyvinyl formal) "Vinylek" K | 7 | 7 | 7 | 7 | 7 |
| Complex viscosity of resin (Pa.s) | $1.2 \times 10^4$ | $1.0 \times 10^5$ | $1.9 \times 10^4$ | $2.7 \times 10^5$ | $5.3 \times 10^4$ |
| Properties of the cured resin |  |  |  |  |  |
| flexural modulus (GPa) | 3.6 | 3.5 | 3.4 | 3.2 | 3.0 |
| tensile elongation (%) | 10.0 | 10.5 | 10.3 | 10.5 | 5.3 |
| Properties of the unidirectional composite |  |  |  |  |  |
| 0° compressive strength (MPa) | 1890 | 1870 | 1840 | 1760 | 1620 |
| 90° tensile strength (MPa) | 90 | 87 | 85 | 81 | 58 |
| 90° tensile elongation (%) | 1.3 | 1.3 | 1.2 | 0.9 | 0.6 |
| 0° interlaminar shear strength (MPa) | 103 | 100 | 97 | 90 | 89 |
| Properties of the cylindrical composite |  |  |  |  |  |
| flexural failure load (N) | 1280 | 1230 | 1210 | 1150 | 990 |
| torsional strength (N.m.deg) | 2830 | 2770 | 2500 | 2300 | 1790 |
| compressive failure load (N) | 710 | 680 | 660 | 490 | 510 |
| Charpy impact absorption energy (J) | 10.6 | 10.3 | 10.3 | 8.1 | 7.2 |

Example 4

This shows an example of the use of N,N-dimethylacrylamide as component (B).

The following raw materials were mixed together in a kneader and a resin composition obtained.

| | |
|---|---|
| bisphenol A type epoxy resin ("Epikote" 828, made by Yuka Shell Epoxy K.K.) | 15 parts |
| bisphenol A type epoxy resin ("Epikote" 1001, made by Yuka Shell Epoxy K.K.) | 30 parts |
| tetraglycidyldiaminodiphenylmethane ("Sumi-epoxy" ELM434, made by the Sumitomo Chemical Co.) | 10 parts |
| biphenyl type epoxy resin ("Epikote" YX4000H, made by Yuka Shell Epoxy K.K.) | 45 parts |
| dicyandiamide ("DICY7", made by Yuka Shell Epoxy K.K.) | 5 parts |
| 3-(3,4-dichlorophenyl)-1,1-dimethylurea ("DCMU99", made by the Hodogaya Chemical Co.) | 3 parts |
| N,N-dimethylacrylamide (made by the Kohjin Co.) | 5 parts |
| polyvinyl formal ("Vinylek" K, made by the Chisso Corp.) | 7 parts |

Using this resin composition, and employing the methods described above, cured resin, unidirectional composite material and cylindrical composite material were prepared and their properties measured. The measurement results are shown in Table 2.

Example 5

This shows an example of the use of acrylamide, instead of the N,N-dimethylacrylamide employed in Example 4, as component (B).

The following raw materials were mixed together in a kneader and a resin composition obtained.

| | |
|---|---|
| bisphenol A type epoxy resin ("Epikote" 828, made by Yuka Shell Epoxy K.K.) | 15 parts |
| bisphenol A type epoxy resin ("Epikote" 1001, made by Yuka Shell Epoxy K.K.) | 30 parts |
| tetraglycidyldiaminodiphenylmethane ("Sumi-epoxy" ELM434, made by the Sumitomo Chemical Co.) | 10 parts |
| biphenyl type epoxy resin ("Epikote" YX4000H, made by Yuka Shell Epoxy K.K.) | 45 parts |
| dicyandiamide ("DICY7", made by Yuka Shell Epoxy K.K.) | 5 parts |
| 3-(3,4-dichlorophenyl)-1,1-dimethylurea ("DCMU99", made by the Hodogaya Chemical Co.) | 3 parts |
| acrylamide (made by Nacalai Tesque Inc.) | 5 parts |
| polyvinyl formal ("Vinylek" K, made by Chisso Corp.) | 7 parts |

Using this resin composition, and employing the methods described above, cured resin, unidirectional composite material and cylindrical composite material were prepared and their properties measured. The measurement results are shown in Table 2.

Example 6

This shows an example of the use of acryloylmorpholine, instead of the N,N-dimethylacrylamide in Example 4, as component (B).

The following raw materials were mixed together in a kneader and a resin composition obtained.

| | |
|---|---|
| bisphenol A type epoxy resin ("Epikote" 828, made by Yuka Shell Epoxy K.K.) | 15 parts |
| bisphenol A type epoxy resin ("Epikote" 1001, made by Yuka Shell Epoxy K.K.) | 30 parts |
| tetraglycidyldiaminodiphenylmethane ("Sumi-epoxy" ELM434, made by the Sumitomo Chemical Co.) | 10 parts |
| biphenyl type epoxy resin ("Epikote" YX4000H, made by Yuka Shell Epoxy K.K.) | 45 parts |
| dicyandiamide ("DICY7", made by Yuka Shell Epoxy K.K.) | 5 parts |
| 3-(3,4-dichlorophenyl)-1,1-dimethylurea ("DCMU99", made by the Hodogaya Chemical Co.) | 3 parts |
| acryloylmorpholine (made by the Kohjin Co.) | 5 parts |
| polyvinyl formal ("Vinylek" K, made by Chisso Corp.) | 7 parts |

Using this resin composition, and employing the methods described above, cured resin, unidirectional composite material and cylindrical composite material were prepared and their properties measured. The measurement results are shown in Table 2.

Example 7

The following raw materials were mixed together in a kneader and a resin composition obtained.

| | |
|---|---|
| bisphenol A type epoxy resin ("Epikote" 828, made by Yuka Shell Epoxy K.K.) | 15 parts |
| bisphenol A type epoxy resin ("Epikote" 1001, made by Yuka Shell Epoxy K.K.) | 30 parts |
| tetraglycidyldiaminodiphenylmethane ("Sumi-epoxy" ELM434, made by the Sumitomo Chemical Co.) | 10 parts |
| biphenyl type epoxy resin ("Epikote" YX4000H, made by Yuka Shell Epoxy K.K.) | 45 parts |
| dicyandiamide ("DICY7", made by Yuka Shell Epoxy K.K.) | 5 parts |
| 3-(3,4-dichlorophenyl)-1,1-dimethylurea ("DCMU99", made by the Hodogaya Chemical Co.) | 3 parts |
| acryloylmorpholine (made by the Kohjin Co.) | 3 parts |
| polyvinyl formal ("Vinylek" K, made by the Chisso Corp.) | 7 parts |

Using this resin composition, and employing the methods described above, cured resin, unidirectional composite material and cylindrical composite material were prepared and their properties measured. The measurement results are shown in Table 2.

Example 8

This shows an example of the combined use of N,N-dimethylacrylamide and acrylamide as component (B).

The following raw materials were mixed together in a kneader and a resin composition obtained.

| | |
|---|---|
| bisphenol A type epoxy resin ("Epikote" 828, made by Yuka Shell Epoxy K.K.) | 15 parts |
| bisphenol A type epoxy resin ("Epikote" 1001, made by Yuka Shell Epoxy K.K.) | 30 parts |
| tetraglycidyldiaminodiphenylmethane ("Sumi-epoxy" ELM434, made by the Sumitomo Chemical Co.) | 10 parts |
| biphenyl type epoxy resin ("Epikote" YX4000H, made by Yuka Shell Epoxy K.K.) | 45 parts |
| dicyandiamide ("DICY7", made by Yuka Shell Epoxy K.K.) | 5 parts |
| 3-(3,4-dichlorophenyl)-1,1-dimethylurea ("DCMU99", made by the Hodogaya Chemical Co.) | 3 parts |
| N,N-dimethylacrylamide (made by the Kohjin Co.) | 3 parts |
| acrylamide (made by Nacalai Tesque Inc.) | 2 parts |
| polyvinyl formal ("Vinylek" K, made by Chisso Corp.) | 7 parts |

Using this resin composition, and employing the methods described above, cured resin, unidirectional composite material and cylindrical composite material were prepared and their properties measured. The measurement results are shown in Table 2.

Example 9

This shows an example of the use of N-hydroxymethylacrylamide instead of the N,N-dimethylacrylamide in Example 4, as component (B).

The following raw materials were mixed together in a kneader and a resin composition obtained.

| | |
|---|---|
| bisphenol A type epoxy resin ("Epikote" 828, made by Yuka Shell Epoxy K.K.) | 15 parts |
| bisphenol A type epoxy resin ("Epikote" 1001, made by Yuka Shell Epoxy K.K.) | 30 parts |
| tetraglycidyldiaminodiphenylmethane ("Sumi-epoxy" ELM434, made by the Sumitomo Chemical Co.) | 10 parts |
| biphenyl type epoxy resin ("Epikote" YX4000H, made by Yuka Shell Epoxy K.K.) | 45 parts |
| dicyandiamide ("DICY7", made by Yuka Shell Epoxy K.K.) | 5 parts |
| 3-(3,4-dichlorophenyl)-1,1-dimethylurea ("DCMU99", made by the Hodogaya Chemical Co.) | 3 parts |
| N-hydroxymethylacrylamide (made by the Nitto Chemical Industry Co.) | 5 parts |
| polyvinyl formal ("Vinylek" K, made by Chisso Corp.) | 7 parts |

Using this resin composition, and employing the methods described above, cured resin, unidirectional composite material and cylindrical composite material were prepared and their properties measured. The measurement results are shown in Table 2.

Example 10

This shows an example of the use of N-glycidylphthalimide instead of the N,N-dimethylacrylamide in Example 4, as component (B).

The following raw materials were mixed together in a kneader and a resin composition obtained.

| | |
|---|---|
| bisphenol A type epoxy resin ("Epikote" 828, made by Yuka Shell Epoxy K.K.) | 15 parts |
| bisphenol A type epoxy resin ("Epikote" 1001, made by Yuka Shell Epoxy K.K.) | 30 parts |

-continued

| | |
|---|---|
| tetraglycidyldiaminodiphenylmethane ("Sumi-epoxy" ELM434, made by the Sumitomo Chemical Co.) | 10 parts |
| biphenyl type epoxy resin ("Epikote" YX4000H, made by Yuka Shell Epoxy K.K.) | 45 parts |
| dicyandiamide ("DICY7", made by Yuka Shell Epoxy K.K.) | 5 parts |
| 3-(3,4-dichlorophenyl)-1,1-dimethylurea ("DCMU99", made by the Hodogaya Chemical Co.) | 3 parts |
| N-glycidylphthalimide ("Denacol" EX731, made by Nagase Chemicals Ltd.) | 5 parts |
| polyvinyl formal ("Vinylek" K, made by Chisso Corp.) | 7 parts |

Using this resin composition, and employing the methods described above, cured resin, unidirectional composite material and cylindrical composite material were prepared and their properties measured. The measurement results are shown in Table 2.

Example 11

This shows an example of the use of p-hydroxyphenylacetamide instead of the N,N-dimethylacrylamide in Example 4, as component (B).

The following raw materials were mixed together in a kneader and a resin composition obtained.

| | |
|---|---|
| bisphenol A type epoxy resin ("Epikote" 828, made by Yuka Shell Epoxy K.K.) | 15 parts |
| bisphenol A type epoxy resin ("Epikote" 1001, made by Yuka Shell Epoxy K.K.) | 30 parts |
| tetraglycidyldiaminodiphenylmethane ("Sumi-epoxy" ELM434, made by the Sumitomo Chemical Co.) | 10 parts |
| biphenyl type epoxy resin ("Epikote" YX4000H, made by Yuka Shell Epoxy K.K.) | 45 parts |
| dicyandiamide ("DICY7", made by Yuka Shell Epoxy K.K.) | 5 parts |
| 3-(3,4-dichlorophenyl)-1,1-dimethylurea ("DCMU99", made by the Hodogaya Chemical Co.) | 3 parts |
| p-hydroxyphenylacetamide (made by the Otsuka Chemical Co.) | 5 parts |
| polyvinyl formal ("Vinylek" K, made by Chisso Corp.) | 7 parts |

Using this resin composition, and employing the methods described above, cured resin, unidirectional composite material and cylindrical composite material were prepared and their properties measured. The measurement results are shown in Table 2.

Comparative Example 3

This shows an example where there was used a resin composition comprising the components of the resin compositions in Examples 4 to 11 but with component (C) excluded.

The following raw materials were mixed together in a kneader and a resin composition obtained.

| | |
|---|---|
| bisphenol A type epoxy resin ("Epikote" 828, made by Yuka Shell Epoxy K.K.) | 15 parts |
| bisphenol A type epoxy resin ("Epikote" 1001, made by Yuka Shell Epoxy K.K.) | 30 parts |
| tetraglycidyldiaminodiphenylmethane ("Sumi-epoxy" ELM434, made by the Sumitomo Chemical Co.) | 10 parts |
| biphenyl type epoxy resin ("Epikote" YX4000H, made by Yuka Shell Epoxy K.K.) | 45 parts |
| dicyandiamide ("DICY7", made by Yuka Shell Epoxy K.K.) | 5 parts |
| 3-(3,4-dichlorophenyl)-1,1-dimethylurea ("DCMU99", made by the Hodogaya Chemical Co.) | 3 parts |
| polyvinyl formal ("Vinylek" K, made by the Chisso Corp.) | 7 parts |

Using this resin composition, and employing the methods described above, cured resin, unidirectional composite material and cylindrical composite material were prepared and their properties measured. The measurement results are shown in Table 2. The 0° compressive strength, 90° tensile strength, 90° tensile elongation and 0° interlaminar shear strength of the unidirectional composite material, and the flexural failure load, torsional strength, compressive failure load and Charpy impact absorption energy of the cylindrical composite material were all inferior when compared to Examples 4 to 11.

Comparative Example 4

This shows an example where, instead of the component (B) in Examples 4 to 11, there was used a compound (N-octylpyrrolidone) containing an amide bond but which does not contain a functional group which can react with the epoxy resin or curing agent.

The following raw materials were mixed together in a kneader and a resin composition obtained.

| | |
|---|---|
| bisphenol A type epoxy resin ("Epikote" 828, made by Yuka Shell Epoxy K.K.) | 15 parts |
| bisphenol A type epoxy resin ("Epikote" 1001, made by Yuka Shell Epoxy K.K.) | 30 parts |
| tetraglycidyldiaminodiphenylmethane ("Sumi-epoxy" ELM434, made by the Sumitomo Chemical Co.) | 10 parts |
| biphenyl type epoxy resin ("Epikote" YX4000H, made by Yuka Shell Epoxy K.K.) | 45 parts |
| dicyandiamide ("DICY7", made by Yuka Shell Epoxy K.K.) | 5 parts |
| 3-(3,4-dichlorophenyl)-1,1-dimethylurea ("DCMU99", made by the Hodogaya Chemical Co.) | 3 parts |
| N-octylpyrrolidone (made by the Aldrich Chemical Co.) | 5 parts |
| polyvinyl formal ("Vinylek" K, made by Chisso Corp.) | 7 parts |

Using this resin composition, and employing the methods described above, cured resin, unidirectional composite material and cylindrical composite material were prepared and their properties measured. The measurement results are shown in Table 2. The flexural modulus and tensile elongation of the cured resin material, the 0° compressive strength, 90° tensile strength, 90° tensile elongation and 0° interlaminar shear strength of the unidirectional composite material, and the flexural failure load, torsional strength, compressive failure load and Charpy impact absorption energy of the cylindrical composite material were all inferior when compared to Examples 4 to 11.

TABLE 2

| | Example 4 | Example 5 | Example 6 | Example 7 | Example 8 | Example 9 | Example 10 | Example 11 | Comp. Example 3 | Comp. Example 4 |
|---|---|---|---|---|---|---|---|---|---|---|
| Component (A) | | | | | | | | | | |
| "Epikote" 828 | 15 | 15 | 15 | 15 | 15 | 15 | 15 | 15 | 15 | 15 |
| "Epikote" 1001 | 30 | 30 | 30 | 30 | 30 | 30 | 30 | 30 | 30 | 30 |
| "Epiclon" 152 | — | — | — | — | — | — | — | — | — | — |
| "Sumi-epoxy" ELM434 | 10 | 10 | 10 | 10 | 10 | 10 | 10 | 10 | 10 | 10 |
| "Epikote" YX4000H | 45 | 45 | 45 | 45 | 45 | 45 | 45 | 45 | 45 | 45 |
| Component (C) | | | | | | | | | | |
| dicyandiamide (curing auxiliary) | 5 | 5 | 5 | 5 | 5 | 5 | 5 | 5 | 5 | 5 |
| 3-(3,4-dichlorophenyl-1,1-dimethylurea) | 3 | 3 | 3 | 3 | 3 | 3 | 3 | 3 | 3 | 3 |
| Component (B) | | | | | | | | | | |
| N,N-dimethylacrylamide | 5 | — | — | — | 3 | — | — | — | — | — |
| acrylamide | — | 5 | — | — | 2 | — | — | — | — | — |
| acryloylmorpholine | — | — | — | 3 | — | — | — | — | — | — |
| N-hydroxymethylacrylamide | — | — | — | — | — | 5 | — | — | — | — |
| N-glycidylphthalimide | — | — | — | — | — | — | 5 | — | — | — |
| p-hydroxyphenylacetamide | — | — | — | — | — | — | — | 5 | — | — |
| (compound with an amide group but no reactive functional group) | | | | | | | | | | |
| N-octylpyrrolidone | — | — | — | — | — | — | — | — | — | 5 |
| Thermoplastic resin (polyvinyl formal) | | | | | | | | | | |
| "Vinylek" K | 7 | 7 | 7 | 7 | 7 | 7 | 7 | 7 | 7 | 7 |
| Complex viscosity of resin (Pa.s) | $3.6 \times 10^4$ | $5.0 \times 10^4$ | $3.9 \times 10^4$ | $5.5 \times 10^4$ | $3.7 \times 10^4$ | $2.1 \times 10^4$ | $6.9 \times 10^4$ | $1.3 \times 10^5$ | $7.2 \times 10^4$ | $2.4 \times 10^4$ |
| Properties of the cured resin | | | | | | | | | | |
| flexural modulus (GPa) | 3.7 | 3.7 | 3.7 | 3.6 | 3.7 | 3.6 | 3.6 | 3.6 | 3.4 | 3.1 |
| tensile elongation (%) | 10.7 | 9.5 | 10.4 | 10.5 | 10.4 | 9.8 | 9.0 | 9.6 | 10.2 | 5.9 |
| Properties of the unidirectional composite | | | | | | | | | | |
| 0° compressive strength (MPa) | 1910 | 1890 | 1900 | 1880 | 1910 | 1890 | 1880 | 1870 | 1800 | 1640 |
| 90° tensile strength (MPa) | 95 | 89 | 93 | 90 | 93 | 91 | 87 | 89 | 84 | 65 |
| 90° tensile elongation (%) | 1.3 | 1.1 | 1.2 | 1.1 | 1.2 | 1.1 | 1.1 | 1.1 | 0.9 | 0.6 |
| 0° interlaminar shear strength (MPa) | 101 | 99 | 97 | 94 | 100 | 99 | 98 | 98 | 89 | 88 |
| Properties of the cylindrical composite | | | | | | | | | | |
| flexural failure load (N) | 1340 | 1270 | 1340 | 1260 | 1330 | 1280 | 1250 | 1270 | 1180 | 1000 |
| torsional strength (N.m.deg) | 2970 | 2900 | 2950 | 2710 | 2910 | 2770 | 2800 | 2820 | 2400 | 1800 |
| compressive failure load (N) | 700 | 680 | 710 | 680 | 690 | 670 | 660 | 670 | 450 | 500 |
| Charpy impact absorption energy (J) | 11.9 | 10.5 | 11.8 | 10.3 | 11.5 | 10.5 | 10.2 | 10.7 | 8.5 | 6.5 |

In Examples 12 to 18 and in the Comparative Example below, the preparation of the resin composition, the molding of the unidirectional composite material and the measurement of the 0° flexural strength and the interlaminar shear strength of the unidirectional material were carried out by the following methods.

(1) Preparation of the Resin Composition and the Measurement of the Viscosity

The components other than the thermolytic polymerization initiator and the accelerator were heated and mixed at 60° C. to produce a uniform liquid. This was cooled to 25° C., after which the thermolytic polymerization initiator and the accelerator were mixed in and the resin composition obtained.

The viscosity of the resin composition was measured at 25° C. using a B-type viscometer (made by Tokyo Keiki) at 6 rpm and again at 60 rpm.

(2) Molding of the Unidirectional Composite

Figure 2:
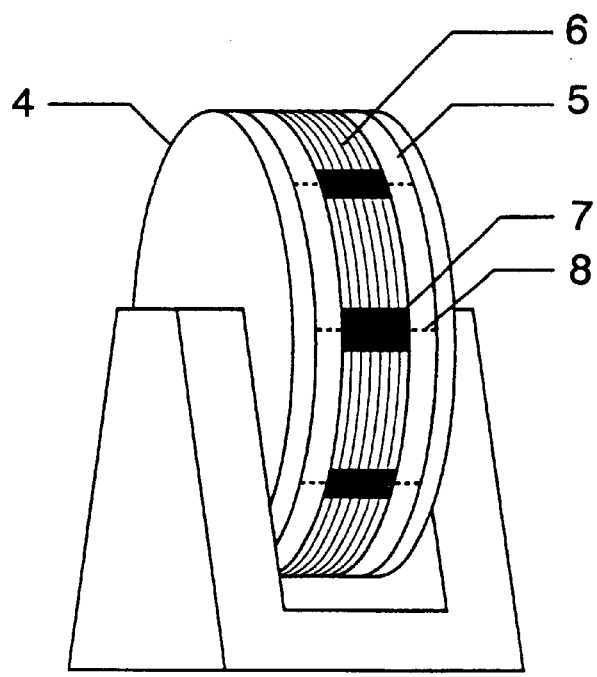
FIG. 2 shows the state of carbon fiber strands wound by means of a drum winder.
Figure 3:
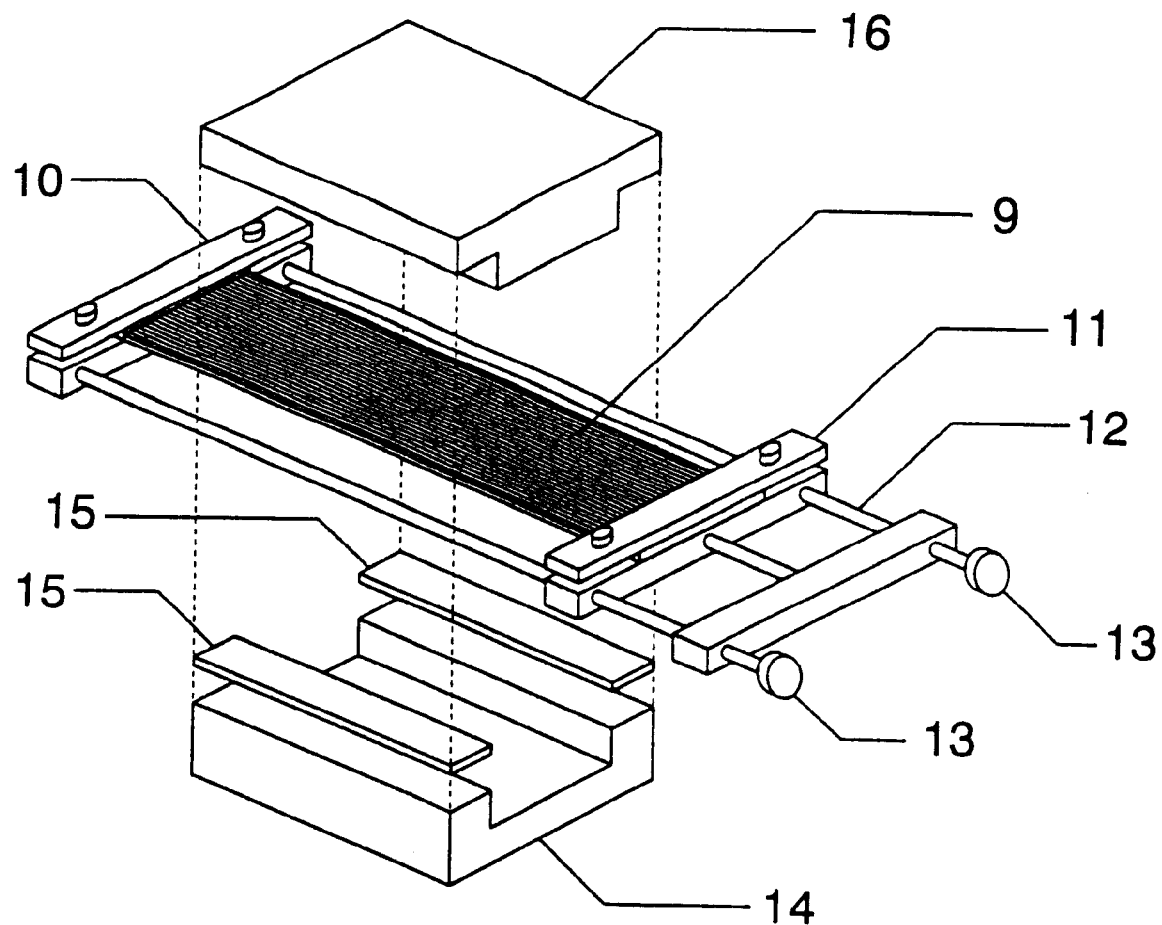
FIG. 3 shows equipment employed in the preparation of a unidirectional composite material.

Firstly, as shown in FIG. 2, release paper 5 was stuck to the drum 4 of a drum winder, and then carbon fiber strands 6 (T700SC-12K-50C, made by Toray Industries, Inc.) were wound around. The wound width was 80 mm and the weight per unit area of fiber was 540 g/m$^2$.

Next, around the wound body of strands there was applied, at 35 cm spacings, a cyanoacrylate resin type instant adhesive 7, and impregnation and curing effected. Cut lines 8 were introduced into the regions where the adhesive had been applied, and the strands removed from the drum 4. In this way carbon fiber unidirectional sheet materials 9, the two ends of which were fixed with adhesive, were obtained.

Then, the release paper 5 was removed, and epoxy resin applied to the ends of four of these carbon fiber unidirectional sheet materials, after which they were superimposed and the ends stuck together. After curing the adhesive, the ends of sheet material 9 were secured in the fixed chuck 10 and moveable chuck 11 of a frame, and the moveable chuck moved using knob 13 so that tension was applied to the sheet material 9. The tensioned sheet material 9 was arranged in the hollow (width 80 mm and length 200 mm) of a lower mold 14, then a vinyl ester resin composition poured in and impregnation of the resin effected under reduced pressure. Subsequently, 2 mm thick spacers 15 and the upper mould 16 were set in place, and pressure applied using a mechanical press at a face pressure of 3 MPa. Curing was carried out by holding for 24 hours at 25° C. in this state, and a unidirectional composite of thickness 2 mm obtained. The volume content of fiber in this unidirectional composite material was 60%.

Next, the unidirectional composite was removed from the mold and heated for 2 hours at 120° C., so that post-curing was effected.

(3) Measurement of the 0° Flexural Strength

Test pieces of width 12.7 mm and length 85 mm were cut from the unidirectional composite material, and then the 0° flexural strength measured by performing a 3-point bending test under the following conditions.

span length: 64 mm loading rate: 2.0 mm/min loading nose diameter: upper side 10 mm, lower side 4 mm measurement temperature: 25° C.

(4) Measurement of the Interlaminar Shear Strength

Test pieces of width 6 mm and length 20 mm were cut from the unidirectional composite material, and then the interlaminar shear strength measured by performing a 3-point bending test under the following conditions.

span length: 10 mm loading rate: 1.3 mm/min loading nose diameter: upper side 10 mm, lower side 4 mm measurement temperature: 25° C.

Example 12

This shows an example of the use of acrylamide as component (B).

The following raw materials were mixed together and a vinyl ester resin composition obtained.

| | |
|---|---|
| bisphenol A diglycidyl ether/methacrylate adduct ("Epoxyester" 3000M, made by the Kyoeisha Chemical Co.) | 60.0 parts |
| styrene (made by Nacalai Tesque Inc.) | 30.0 parts |
| acrylamide (made by Nacalai Tesque Inc.) | 10.0 parts |
| thermolytic polymerization initiator ("Percure" VL, made by the Nippon Oil & Fats Co.) | 1.5 part |
| cobalt naphthenate ("Rigolac" Cobalt N, made by the Showa Highpolymer Co.) | 0.5 part |

The viscosity of the resin composition was 0.30 Pa.s at 6 rpm and 0.15 Pa.s at 60 rpm.

Using this resin composition, a unidirectional composite material was molded, and the 0° flexural strength and the interlaminar shear strength measured, by the methods described above. The measurement results were as follows.

| | |
|---|---|
| 0° flexural strength: | 1830 MPa |
| interlaminar shear strength: | 85.5 MPa |

Example 13

This shows an example of the use of N,N-dimethylacrylamide as component (B).

The following raw materials were mixed together and a vinyl ester resin composition obtained.

| | |
|---|---|
| bisphenol A diglycidyl ether/methacrylate adduct ("Epoxyester" 3000M, made by the Kyoeisha Chemical Co.) | 60.0 parts |
| styrene (made by Nacalai Tesque Inc.) | 30.0 parts |
| N,N-dimethylacrylamide (made by the Kohjin Co.) | 10.0 parts |
| thermolytic polymerization initiator ("Percure" VL, made by the Nippon Oil & Fats Co.) | 1.5 part |
| cobalt naphthenate ("Rigolac" Cobalt N, made by the Showa Highpolymer Co.) | 0.5 part |

The viscosity of the resin composition was 0.060 Pa.s at 6 rpm and 0.061 Pa.s at 60 rpm.

Using this composition, a unidirectional composite was molded, and the 0° flexural strength and the interlaminar shear strength measured, by the methods described above. The measurement results were as follows.

| | |
|---|---|
| 0° flexural strength: | 1890 MPa |
| interlaminar shear strength: | 86.5 MPa |

Example 14

This shows an example of the use of acryloylmorpholine as component (B).

The following raw materials were mixed together and a vinyl ester resin composition obtained.

| | |
|---|---|
| bisphenol A diglycidyl ether/methacrylate adduct ("Epoxyester" 3000M, made by the Kyoeisha Chemical Co.) | 60.0 parts |
| styrene (made by Nacalai Tesque Inc.) | 30.0 parts |
| acryloylmorpholine (made by the Kohjin Co.) | 10.0 parts |
| thermolytic polymerization initiator ("Percure" VL, made by the Nippon Oil & Fats Co.) | 1.5 part |
| cobalt naphthenate ("Rigolac" Cobalt N, made by the Showa Highpolymer Co.) | 0.5 part |

The viscosity of the resin composition was 0.11 Pa.s at 6 rpm and 0.11 Pa.s at 60 rpm.

Using this composition, a unidirectional composite was molded, and the 0° flexural strength and the interlaminar shear strength measured, by the methods described above. The measurement results were as follows.

| | |
|---|---|
| 0° flexural strength: | 1800 MPa |
| interlaminar shear strength: | 84.2 MPa |

Example 15

This shows an example of the use of N-vinylpyrrolidone as (B).

The following raw materials were mixed together and a vinyl ester resin composition obtained.

| | |
|---|---|
| bisphenol A diglycidyl ether/methacrylate adduct ("Epoxyester" 3000M, made by the Kyoeisha Chemical Co.) | 60.0 parts |
| styrene (made by Nacalai Tesque Inc.) | 30.0 parts |
| N-vinylpyrrolidone (made by Nacalai Tesque Inc.) | 10.0 parts |
| thermolytic polymerization initiator ("Percure" VL, made by the Nippon Oil & Fats Co.) | 1.5 part |
| cobalt naphthenate ("Rigolac" Cobalt N, made by the Showa Highpolymer Co.) | 0.5 part |

The viscosity of the resin composition was 0.070 Pa.s at 6 rpm and 0.073 Pa.s at 60 rpm.

Using this composition, a unidirectional composite material was molded, and the 0° flexural strength and the interlaminar shear strength measured, by the methods described above. The measurement results were as follows.

| | |
|---|---|
| 0° flexural strength: | 1760 MPa |
| interlaminar shear strength: | 81.5 MPa |

Example 16

This shows an example of the use of N-methoxymethylacrylamide as component (B).

The following raw materials were mixed together and a vinyl ester resin composition obtained.

| | |
|---|---|
| bisphenol A diglycidyl ether/methacrylate adduct ("Epoxyester" 3000M, made by the Kyoeisha Chemical Co.) | 60.0 parts |
| styrene (made by Nacalai Tesque Inc.) | 30.0 parts |
| N-methoxymethylacrylamide (made by Nitto Chemical Industry Co.) | 10.0 parts |
| thermolytic polymerization initiator ("Percure" VL, made by the Nippon Oil & Fats Co.) | 1.5 part |
| cobalt naphthenate ("Rigolac" Cobalt N, made by the Showa Highpolymer Co.) | 0.5 part |

The viscosity of the resin composition was 0.10 Pa.s at 6 rpm and 0.10 Pa.s at 60 rpm.

Using this composition, a unidirectional composite material was molded, and the 0° flexural strength and the interlaminar shear strength measured, by the methods described above. The measurement results were as follows.

| | |
|---|---|
| 0° flexural strength: | 1750 MPa |
| interlaminar shear strength: | 80.8 MPa |

Example 17

This shows an example of the use of N-isopropylacrylamide as component (B).

The following raw materials were mixed together and a vinyl ester resin composition obtained.

| | |
|---|---|
| bisphenol A diglycidyl ether/methacrylate adduct ("Epoxyester" 3000M, made by the Kyoeisha Chemical Co.) | 60.0 parts |
| styrene (made by Nacalai Tesque Inc.) | 30.0 parts |
| N-isopropylacrylamide (made by the Kohjin Co.) | 10.0 parts |
| thermolytic polymerization initiator ("Percure" VL, made by Nippon Oil & Fats Co.) | 1.5 part |
| cobalt naphthenate ("Rigolac" Cobalt N, made by the Showa Highpolymer Co.) | 0.5 part |

The viscosity of the resin composition was 0.11 Pa.s at 6 rpm and 0.12 Pa.s at 60 rpm.

Using this composition, a unidirectional composite was molded, and the 0° flexural strength and the interlaminar shear strength measured, by the methods described above. The measurement results were as follows.

| | |
|---|---|
| 0° flexural strength: | 1810 MPa |
| interlaminar shear strength: | 84.2 MPa |

Example 18

This shows an example of the use of N,N-diethylacrylamide as component (B).

The following raw materials were mixed together and a vinyl ester resin composition obtained.

| | |
|---|---|
| bisphenol A diglycidyl ether/methacrylate adduct ("Epoxyester" 3000M, made by the Kyoeisha Chemical Co.) | 60.0 parts |
| styrene (made by Nacalai Tesque Inc.) | 30.0 parts |
| N,N-diethylacrylamide (made by the Kohjin Co.) | 10.0 parts |
| thermolytic polymerization initiator ("Percure" VL, made by Nippon Oil & Fats Co.) | 1.5 part |
| cobalt naphthenate ("Rigolac" Cobalt N, made by the Showa Highpolymer Co.) | 0.5 part |

The viscosity of the resin composition was 0.72 Pa.s at 6 rpm and 0.74 Pa.s at 60 rpm.

Using this composition, a unidirectional composite was molded, and the 0° flexural strength and the interlaminar shear strength measured, by the methods described above. The measurement results were as follows.

| | |
|---|---|
| 0° flexural strength: | 1830 MPa |
| interlaminar shear strength: | 85.7 MPa |

Comparative Example 8

This shows an example in which no component (B) was employed.

The following raw materials were mixed together and a vinyl ester resin composition obtained.

| | |
|---|---|
| bisphenol A diglycidyl ether/methacrylate adduct ("Epoxyester" 3000M, made by the Kyoeisha Chemical Co.) | 60.0 parts |
| styrene (made by Nacalai Tesque Inc.) | 40.0 parts |
| thermolytic polymerization initiator ("Percure" VL, made by Nippon Oil & Fats Co.) | 1.5 part |
| cobalt naphthenate ("Rigolac" Cobalt N, made by the Showa Highpolymer Co.) | 0.5 part |

The viscosity of the resin composition was 0.045 Pa.s at 6 rpm and 0.047 Pa.s at 60 rpm.

Using this composition, a unidirectional composite was molded, and the 0° flexural strength and the interlaminar shear strength measured, by the methods described above. The measurement results were as follows.

| | |
|---|---|
| 0° flexural strength: | 1640 MPa |
| interlaminar shear strength: | 77.0 MPa |

As is clear from these results, there is obtained a composite material in which the 0° flexural strength and the interlaminar shear strength are both considerably lower than in Examples 12 to 18.

Industrial Utilization Potential

In accordance with the present invention there is obtained a thermosetting resin composition which shows excellent adhesion between the cured material and reinforcing fiber, and which is outstanding in the elastic modulus of the cured material. Using this composition, there can be obtained fiber reinforced composite materials which are outstanding in their 0° compressive strength, 90° tensile strength and interlaminar shear strength, and which are also outstanding in their impact resistance.

What is claimed is:

1. A thermosetting resin composition for carbon fiber reinforced composite materials, comprising:
   (i) 100 parts by weight of a component (A) comprising a thermosetting resin, wherein said component (A) comprises an epoxy resin, a curing agent (C) and 1 to 20 parts by weight of a thermoplastic resin comprising hydrogen bonding functional groups per 100 parts by weight of said component (A), and
   (ii) 0.5 to 20 parts by weight of a component (B) comprising a compound comprising a functional group that can react with said thermosetting resin or a curing agent,
   wherein said compound comprises a moiety selected from the group consisting of formula (6), formula (7) and formula (10) having the following structures:

(6)

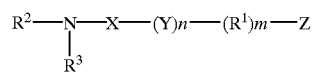

wherein $X_1$ represents,

wherein $R^1$ represents a divalent group derived from a hydrocarbon, and m represents 0 or 1; $R^2$ represents hydrogen, $R^3$ represents hydrogen;
wherein Y represents —O— or —$NR^5$—, wherein $R^5$ represents an alkyl group, or aryl group, and n represents 0 or 1;
wherein Z represents a phenolic hydroxyl group;

(7)

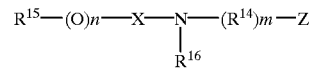

wherein $X_2$ represents,

wherein $R^{14}$ represents a divalent group derived from a hydrocarbon, and m represents 0 or 1; $R^{15}$ represents an alkyl group or an aryl group, and $R^{16}$ represents hydrogen, an alkyl group, aryl group or acyl group;
wherein Z represents a phenolic hydroxyl group and an epoxy group;

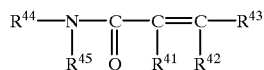 (10)

wherein $R^{41}$, $R^{42}$ and $R^{43}$ each represent hydrogen, an alkyl group or an aryl group; $R^{44}$ represents hydrogen, an alkyl group or an aryl group, and $R^{45}$ represents hydrogen, an alkyl group, an aryl group;
wherein the alkyl groups and aryl groups optionally have substituent groups selected from the group consisting of alkyl groups, aryl groups, halogens and alkoxy groups, and wherein any two of $R^{41}$, $R^{42}$, $R^{43}$, $R^{44}$ and $R^{45}$ optionally form a ring.

2. A thermosetting resin composition for carbon fiber reinforced composite materials according to claim 1 wherein said component (B) is a compound having a structure represented by general formula 6.

3. A thermosetting resin composition for carbon fiber reinforced composite materials according to claim 1, wherein the flexural modulus of the cured material is at least 3.2 GPa.

4. A thermosetting resin composition for carbon fiber reinforced composite materials according to claim 1, wherein the elongation at break of the cured material is at least 8%.

5. A thermosetting resin composition for carbon fiber reinforced composite materials according to claim 1, wherein the complex viscosity obtained by carrying out dynamic viscoelasticity measurement at 0.5 Hz and 25° C. is 10,000 to 300,000 Pa.s.

6. A prepreg formed by impregnating carbon fiber with a thermosetting resin composition according to claim 1.

7. Carbon fiber reinforced composite materials comprising carbon fiber and a cured thermosetting resin composition according to claim 1.

* * * * *